Jan. 5, 1971  R. D. CONE  3,553,681
VARIABLE INCREMENT DIGITIZER
Filed Dec. 15, 1966  10 Sheets-Sheet 1

INVENTOR.
RONALD D. CONE

BY
FOWLER, KNOBBE
& MARTENS
ATTORNEYS.

Jan. 5, 1971
R. D. CONE
3,553,681
VARIABLE INCREMENT DIGITIZER
Filed Dec. 15, 1966
10 Sheets-Sheet 3
Fig. 3.
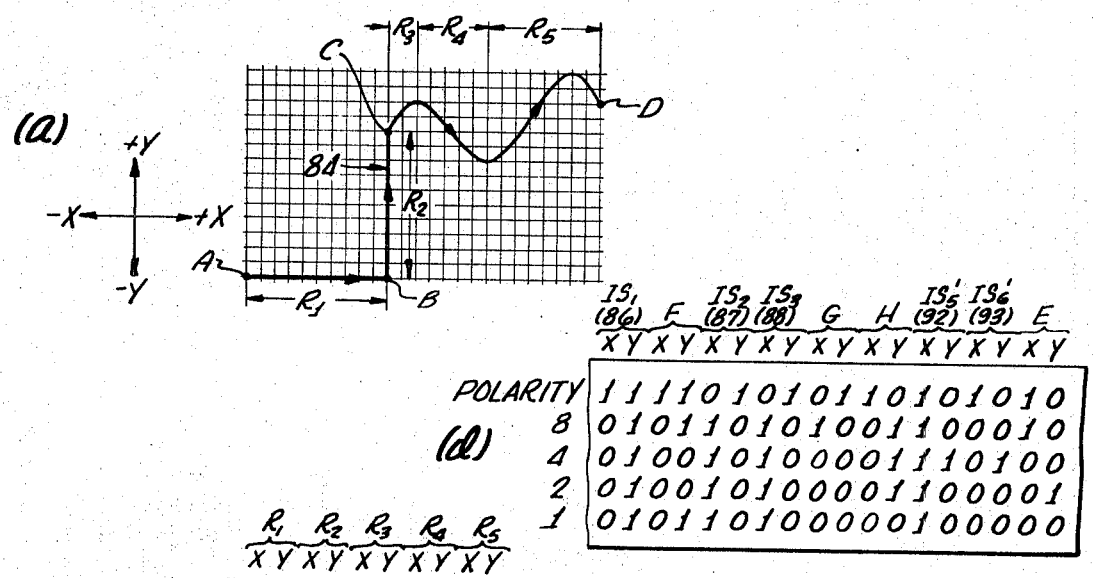
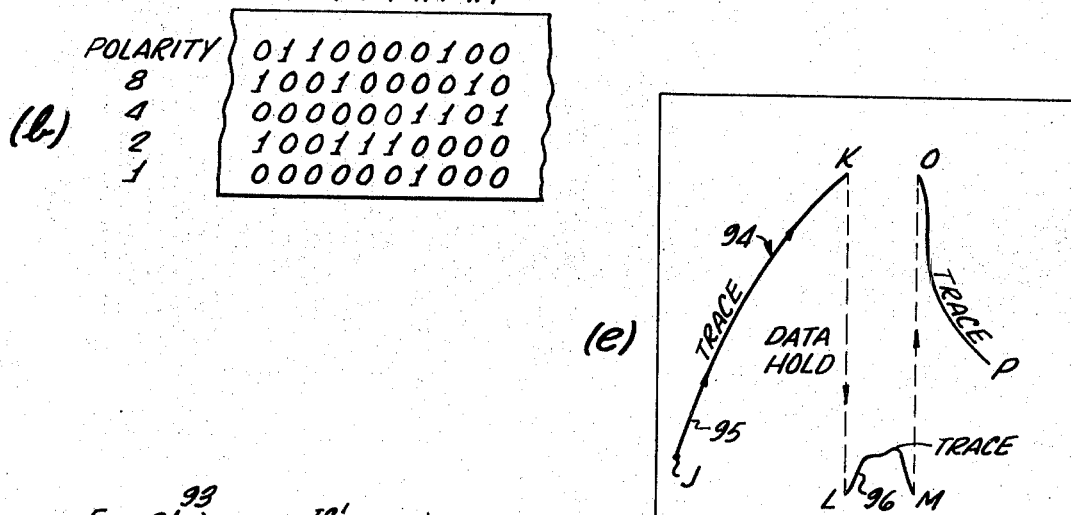
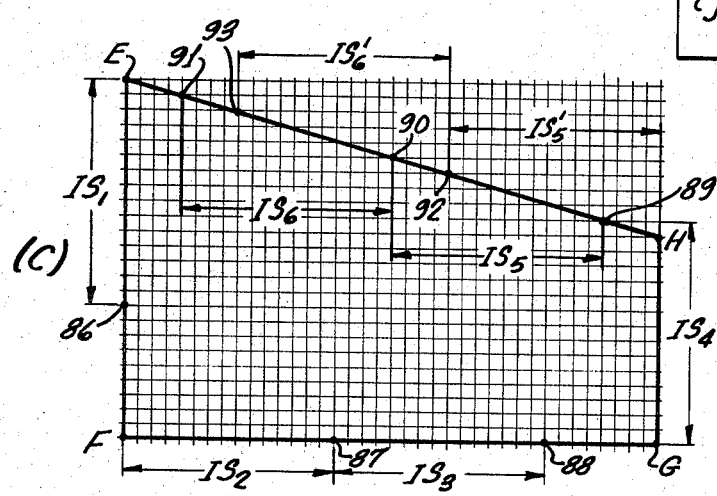
INVENTOR.
RONALD D. CONE
BY
FOWLER, KNOBBE
& MARTENS
ATTORNEYS.

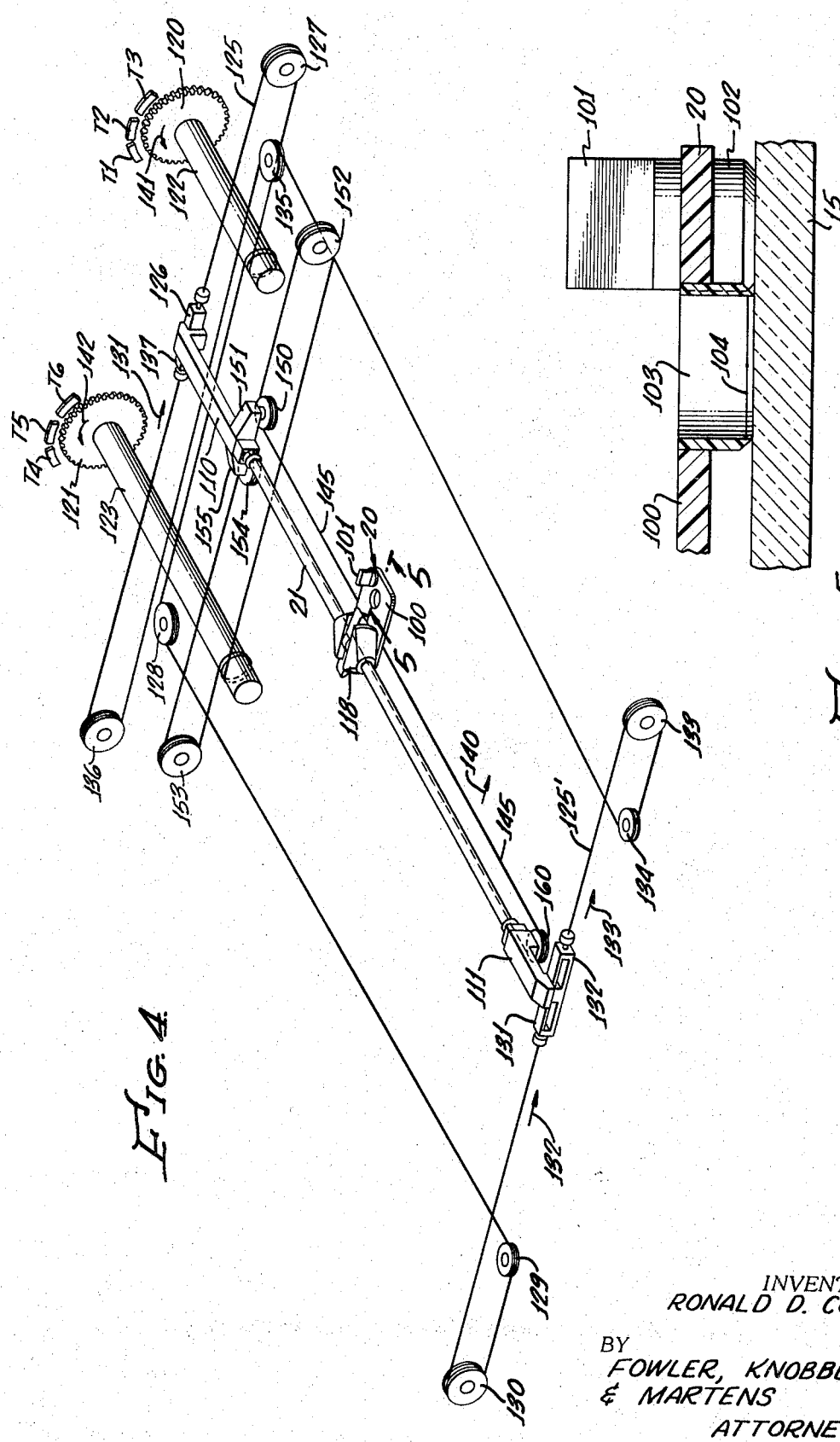

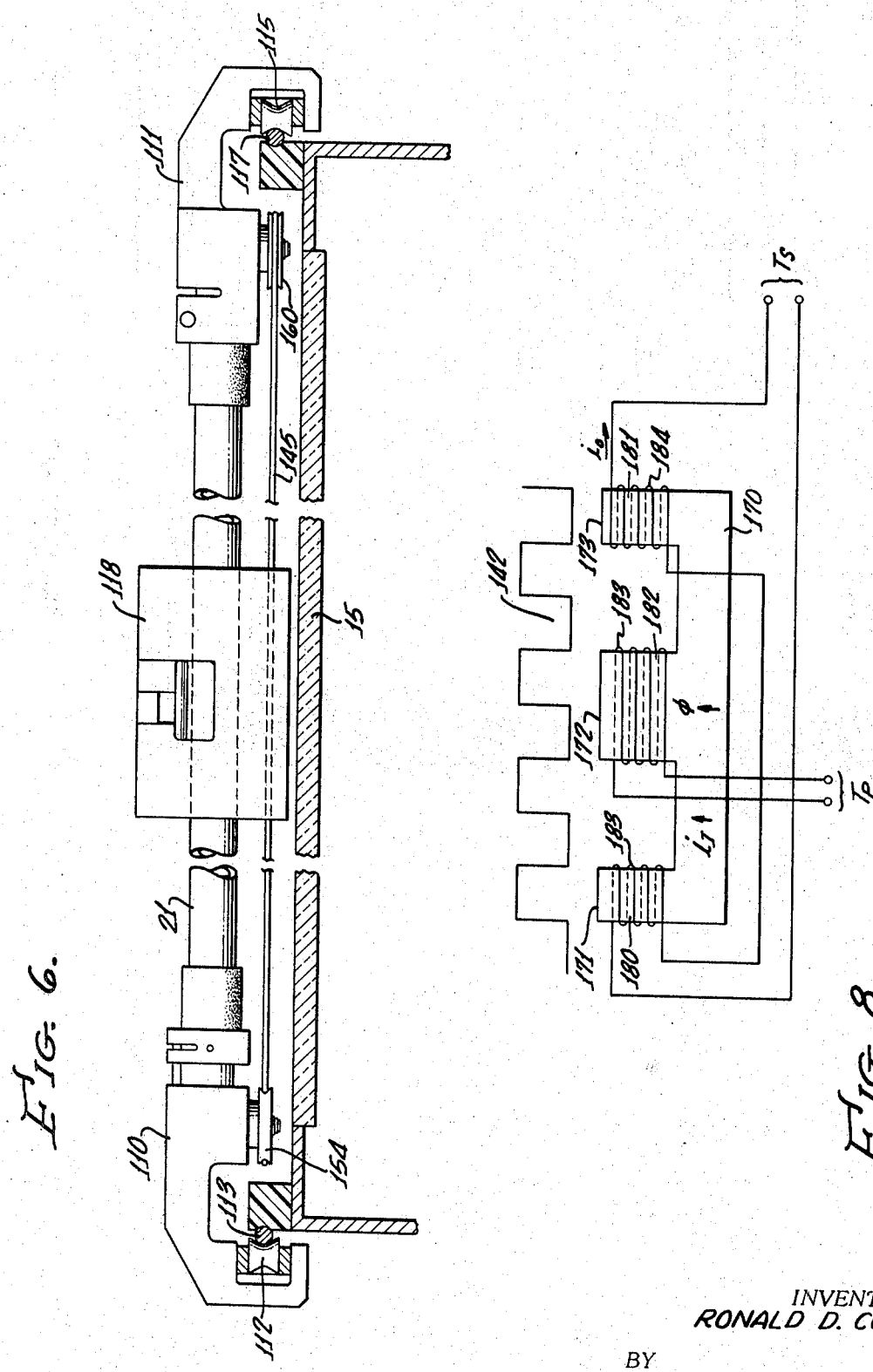

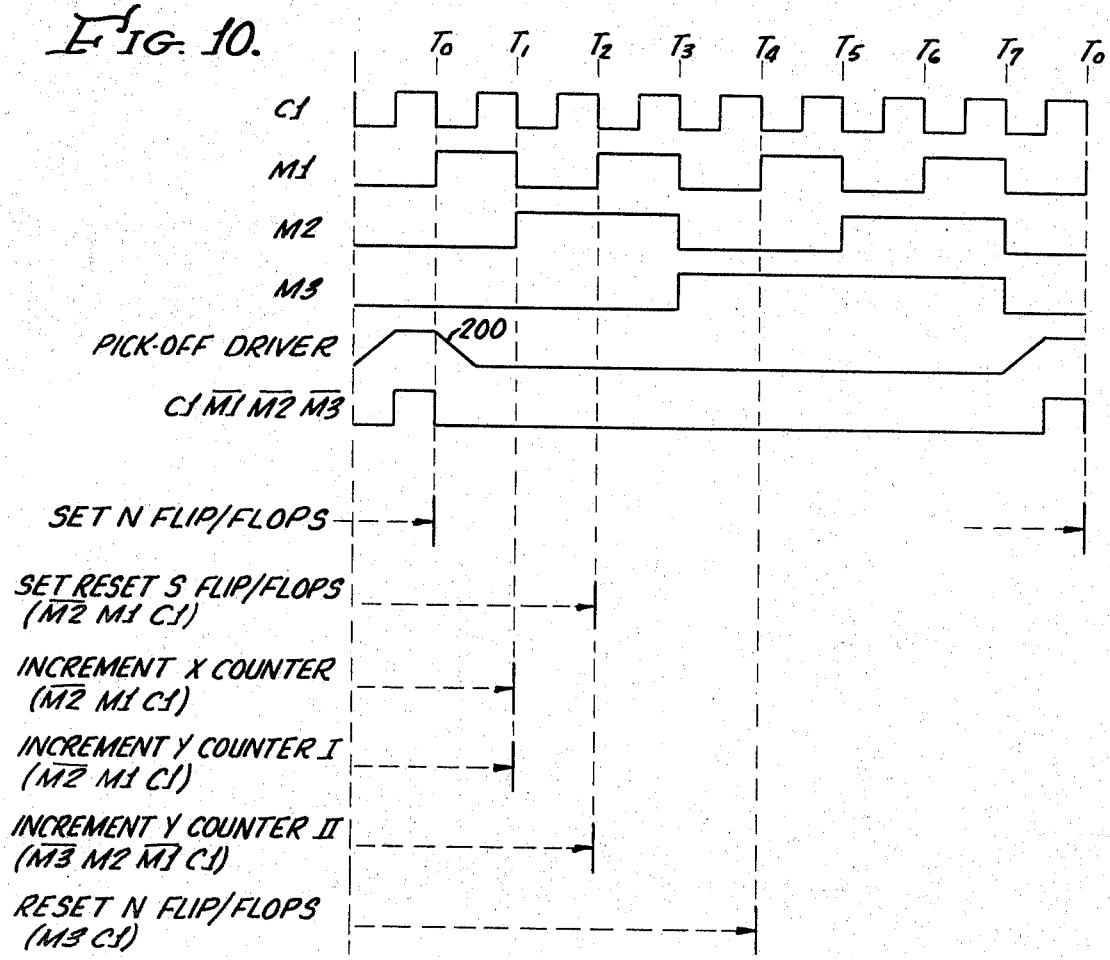
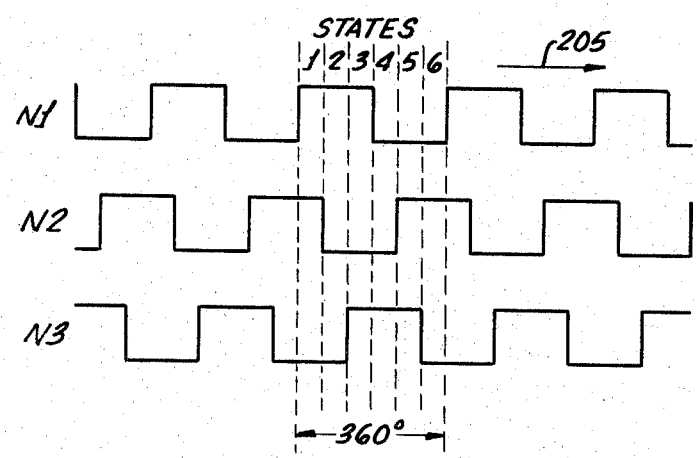

| MODE | OUTPUTS OF A DRIVERS FROM $T_0$ TO $T_2$ | | | | OUTPUTS FROM +Y & -Y DRIVERS | | | |
|---|---|---|---|---|---|---|---|---|
| | A4 | A3 | A2 | A1 | I AT $T_1$ | | II AT $T_2$ | |
| | -Z | +Z | -X | +X | -Y | +Y | -Y | +Y |
| 0 | 0 | 0 | 0 | 0 | 0 | 0 | 0 | 0 |
| 1 | 0 | 0 | 0 | 1 | 1 | 0 | 0 | 0 |
| 2 | 0 | 0 | 1 | 0 | 0 | 1 | 0 | 0 |
| 3 | 0 | 1 | 0 | 0 | 0 | 1 | 0 | 0 |
| 4 | 0 | 1 | 0 | 1 | 0 | 0 | 0 | 0 |
| 5 | 0 | 1 | 1 | 0 | 0 | 1 | 0 | 1 |
| 6 | 1 | 0 | 0 | 0 | 1 | 0 | 0 | 0 |
| 7 | 1 | 0 | 0 | 1 | 1 | 0 | 1 | 0 |
| 8 | 1 | 0 | 1 | 0 | 0 | 0 | 0 | 0 |

_Fig. 14._

| $X_4$ | $X_3$ | $X_2$ | $X_1$ | $X_0$ | ACCUMULATED VALUE |
|---|---|---|---|---|---|
| 1 | 1 | 1 | 1 | 1 | 31 |
| . | . | . | . | . | . |
| 0 | 0 | 1 | 0 | 1 | 5 |
| 0 | 0 | 1 | 0 | 0 | 4 |
| 0 | 0 | 0 | 1 | 1 | 3 |
| 0 | 0 | 0 | 1 | 0 | 2 |
| 0 | 0 | 0 | 0 | 1 | 1 |
| 0 | 0 | 0 | 0 | 0 | 0 |
| 0 | 0 | 0 | 0 | 1 | -1 |
| 0 | 0 | 0 | 1 | 0 | -2 |
| 0 | 0 | 0 | 1 | 1 | -3 |
| 0 | 0 | 1 | 0 | 0 | -4 |
| 0 | 0 | 1 | 0 | 1 | -5 |
| 0 | 0 | 1 | 1 | 0 | -6 |
| 0 | 0 | 1 | 1 | 1 | -7 |
| . | . | . | . | . | . |
| 1 | 1 | 1 | 1 | 1 | -31 |

_Fig. 13._

INVENTOR.
RONALD D. CONE

BY
FOWLER, KNOBBE
& MARTENS
ATTORNEYS.

INVENTOR.
RONALD D. CONE

BY
FOWLER, KNOBBE
& MARTENS
ATTORNEYS.

United States Patent Office 3,553,681
Patented Jan. 5, 1971

3,553,681
VARIABLE INCREMENT DIGITIZER
Ronald D. Cone, Saratoga, Calif., assignor to
Calma Company
Filed Dec. 15, 1966, Ser. No. 601,968
The portion of the term of the patent subsequent to
Apr. 7, 1987, has been disclaimed
Int. Cl. G06f 3/05; H03k 13/02
U.S. Cl. 340—347          25 Claims

ABSTRACT OF THE DISCLOSURE

A graphical data digitizer translating movement of a stylus into X and Y digital data, and X and Y reversible counters for accumulating this digital data for a predetermined interval of time. This data—representing size of the sampling increment—is recorded as a binary encoded character on magnetic tape. This increment size automatically varies proportionally with the speed at which the stylus is traced over the data. A minimum increment size selector is also provided for inhibiting recording of the data until a predetermined value is recorded in the reversible counters.

CROSS-REFERENCE TO RELATED APPLICATION

Reference is made to the copending application of Ronald D. Cone (inventor of the present invention) and John A. Dykmans entitled "Graphical Data Digitizer," Ser. No. 515,419, filed Dec. 21, 1965, now Pat. No. 3,505,670 and assigned to Calma Company, assignee of the present invention.

BACKGROUND OF THE INVENTION

The invention relates to a graphical data digitizer for converting graphical data into magnetically recorded digital data. The present state of the art is best exemplified by the invention disclosed and claimed in the copending application entitled "Graphical Data Digitizer," supra. This prior application discloses a very low mass stylus system and means for recording incremental changes in movement of the stylus. The accurate digitizing of graphical data provided thereby represented a substantial advance in the state of the art.

SUMMARY OF THIS INVENTION

The present invention relates to still further improvements in the art wherein means are provided for accumulating varying amounts of digital data corresponding to variable incremental sizes, the amount of digital data depending upon the speed of translation of the stylus over the graphical analog data. The digitizing and sampling rates are thus respectively proportional and inversely proportional to the rate at which the stylus is traced over the graphical data. This mode of operation considerably improves the efficiency of the digitizing process, the digitization being performed at a considerably faster rate without, however, substantially reducing the accuracy thereof. For example, over straight lines, the stylus can be advanced very rapidly without loss of accuracy since even a low sampling rate produces sufficient data to reconstruct the straight line. With complex curves and like graphical data, the operator must slow down to accurately trace the stylus over the data. In so doing, the operator automatically increases the sampling rate so as to increase the amount of digital data per unit length of graphical data.

The variable increment digitizing mode also particularly lends itself to the digitizing of points, such as points on a map, the vertices of a geometric figure, etc. Thus, when the operator slows down or stops at a point, the exact location of that point will be recorded within the limits of the system resolution—0.005 or 0.01 inch in the embodiment described hereinafter.

Another advantage of the present invention is that the operator may select the sampling interval to be recorded on the magnetic tape. In this mode, the stylus must be advanced through a preselected increment in the X or Y direction before a character is recorded, regardless of the translation speed of the stylus. This mode provides high tape efficiency, i.e. a minimal amount of magnetic tape used to record a given length of graphical trace. By way of specific example, using a 0.15 inch sample interval, one mile of tracing requires only 126.5 feet of magnetic tape using representative state-of-the-art incremental recorders.

An additional feature of this invention is the provision of a "data point" control which permits the operator to both maintain high tape efficiency and precisely digitize the location of selected points. As described in detail hereinafter, this control overrides the increment size selector mode and records a digital character corresponding to the precise location of the selected point. As a result, maps and other forms of data defined by selected points may be digitized to the resolution accuracy of the instrument without reducing tape efficiency for the tracing intervals between such points.

A more thorough understanding of the invention may be obtained by a study of the following detailed description taken in connection with the accompanying drawings, in which:

FIG. 3a is a representative example of graphical analog data used for illustrating the variable increment mode of the digitizer of FIG. 1;

FIG. 3b illustrates the characters encoded on magnetic tape for digitizing the analog graphical data of FIG. 3a;

FIG. 3c is a representative example of graphical analog data used for illustrating the increment size selector means and the data point control provided by the digitizer of FIG. 1;

FIG. 3d illustrates the characters encoded on magnetic tape for digitizing the analog graphical data of FIG. 3c;

FIG. 3e is a representative example of graphical analog data used for illustrating the use of the data hold mode for digitizing discontinuous analog graphical data;

FIG. 4 is a perspective schematic illustrating the mechanical linkage interconnecting the stylus and carriage assembly with the X and Z axis digitizing armatures and pickoffs;

FIG. 5 is a cross-sectional view taken along the line 5—5 of FIG. 4 illustrating details of the stylus assembly;

FIG. 6 is a partial side elevation view illustrating details of the carriage assembly;

FIG. 8 illustrates the core and winding structure of a single pickoff head;

FIG. 10 is a timing diagram illustrating the waveforms defining the digitizing period and the timing of the encoding and counting functions performed during this period;

FIG. 12 illustrates the outputs of the N flip-flops associated with the X axis encoder;

FIG. 13 is a table illustrating the forward and backward counting function of the reversible X and Y binary counters;

FIG. 14 is a table illustrating the translation of the X and Z data into Y data;

DESCRIPTION OF THE PREFERRED EMBODIMENT

Figure 1:
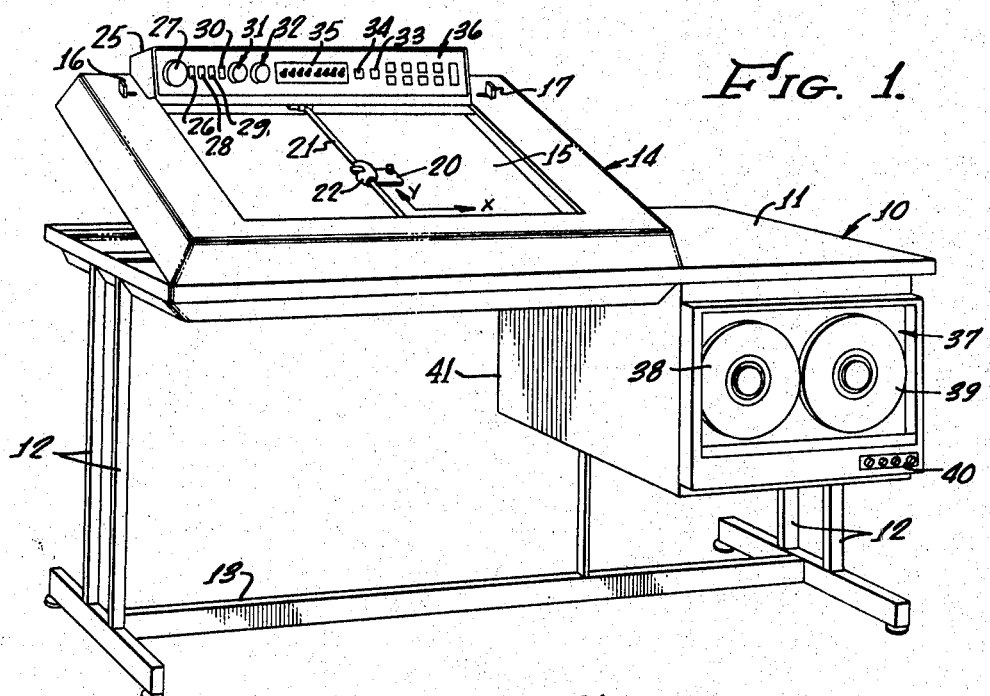
FIG. 1 is a perspective view of the preferred embodiment of the variable increment digitizer constructed in accordance with this invention.

Referring now to FIG. 1, there is shown a graphical data digitizer for converting graphical data on transparent, transluscent or opaque sheets or in optically projected form to magnetically recorded digital data.

The digitizer components are supported by a table 10 having a top 11, legs 12, and a base assembly 13.

Housing 14 is mounted to the upper surface of the top 11 in a position sloping upwardly from the front of the table 10 and supports tracing bed or screen 15 and associated paper-drive mechanism. The rear of housing 14 is advantageously adjustable for height so as to vary the slope of the tracing bed 15 to the most comfortable position for any particular operator. Tracing bed 15 is designed to provide a platform for receiving the analog graphical data. Small plots are fixed to the upper surface of bed 15 with masking tape, while larger plots are engaged in mechanical hold-downs at opposite ends of the tracing bed which are engaged by respective levers 16 and 17. Analog data in roll form is accommodated by the paper drive mechanism described and claimed in the copending application entitled "Graphical Data Digitizer," supra, which mechanism selectively advances the analog data across the face of the tracing bed. The tracing bed 15 advantageously comprises a sheet of white transluscent Plexiglas. This screen is illuminated from below for data on non-opaque sheets, or data may be received on the screen by optically projecting the data from the underside thereof. Also for this reason, the table 10 preferably is formed as an open framework under the housing 14 so as to permit optical projection from beneath the housing.

A graphical data follower means includes a stylus 20 and a carriage assembly for mounting the stylus for movement along mutually orthogonal X and Y axes. This assembly includes a rod 21 supported for transverse movement along the X axis across the tracing bed 15 and a stylus housing 22 slideably supported on the rod 21 for movement along the Y axis.

A control panel 25 is mounted at the rear of housing 14 for initiating operation of the machine and for selecting the operational modes for performing a graphical data digitization. The controls include a main power switch 26, a chart-drive motor control 27, a record error indicator light 28, a speed error indicator light 29, digitizing/manual entry mode selector switch 30, an X increment size selector switch 31, a Y increment size selector switch 32, a data point switch 33, a data hold switch 34, a variable increment selector 35, and a manual entry keyboard 36.

The housing 14, tracing bed 15, movable stylus 20, and control panel 25 are advantageously formed as an integral unit as shown so that the plane of the tracing bed may be adjusted to any angle convenient to the operator. Thus, the rear of the housing many be elevated as shown to provide a uniform slope angle for the tracing bed, or all four corners of the bed may be adjusted to different heights to angle the tracer bed in all four quadrants defined by the X and Y axes.

A housing 41 mounted underneath the top 11 mounts the incremental or digital stepping magnetic tape recorder 37 and the electronic control and logic circuitry of the digitizer. As shown, the tape recorder includes magnetic tape mounted on a pair of take-up reels 38, 39 and a separate control panel 40. For optimum results, the recorder should have a tape transport adapted for recording at least 200 characters per second and a density recording factor of at least 200 bits per inch in a format compatible with I.B.M. and other commercial digital computers.

GENERAL DESCRIPTION OF THE GRAPHICAL DATA DIGITIZER

Figure 2:
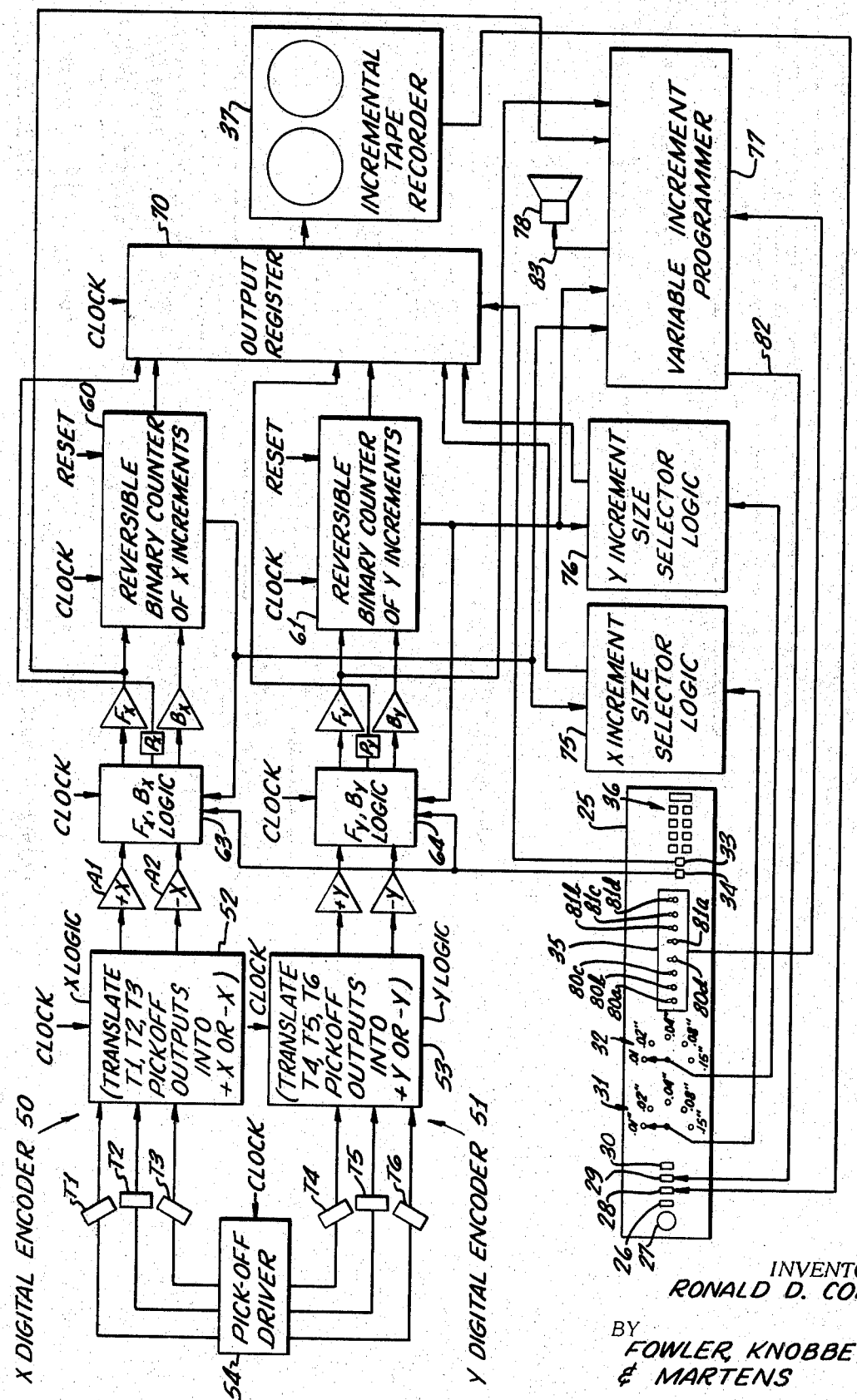
FIG. 2 is a simplified block diagram of the overall system.

A simplified overall view of the digitizer system is shown in FIG. 2. Referring to this figure and FIG. 1, analog data is digitized directly on the incremental magnetic tape recorder 37 by tracing the analog plot on tracing bed 15 with the movable stylus 20. Asynchronous movements of the stylus are recorded as synchronized characters on the magnetic tape. Also recorded on the tape, through the manual keyboard 31, are the required programming instructions to the final processing digital computer, e.g. scale factor, zero offset, and error correction, by entering the proper code in the 1, 2, 4, 8, A and B data channels and a separate Inter-Record-Gap (IRG) position, as described in detail in the copending application "Graphical Data Digitizer," supra.

As the operator traces the analog plot, each movement of the stylus 20 through a predetermined incremental distance, e.g. .005 inch, in either the X or Y direction causes a pulse to be generated by a respective one of the X or Y digital encoders 50, 51. These encoders include a digitizing wheel (shown and described hereinafter), pickoff heads . . . T1, T2 and T3 for the X encoder and pickoff heads T4, T5 and T6 for the Y encoder . . . and X logic 52 and Y logic 53. Each of these pickoffs are excited by a clock synchronized pickoff driver 54.

The X logic 52 translates the outputs of pickoffs T1, T2 and T3 into digital data corresponding to $+X$ or $-X$ and applies an appropriate signal to the A1 and A2 drivers. Accordingly, if the stylus 20 is moved one increment of distance in the $+X$ direction, a positive or "true" pulse is applied at the output of the A1 driver and ground or "false" potential at the output of the A2 driver. Likewise, if the stylus 20 is moved one increment of distance in the $-X$ direction, the resulting movement is read out as a positive pulse at the output of the A2 driver and ground potential at the output of the A1 driver. No movement or movement less than the predetermined incremental distance along the X axis produces no pulse outputs at either the A1 or the A2 drivers. Similarly, stage 53 translates the outputs of pickoffs T4, T5 and T6 into $+Y$ or $-Y$ data at the outputs of the $+Y$ and $-Y$ drivers. The pulse outputs from the X and Y logic are synchronized with the system clock by the clock inputs to stages 52 and 53 so that although the movements of the stylus may be completely random and asynchronous, the recorded data is synchronized by a common clock.

The pulses representing movement in the X direction are accumulated in a first reversible binary counter 60 and the pulses representing movement in the Y direction are accumulated in a second reversible binary counter 61. Each of these binary counters includes a forward and a backward input respectively driven by forward drivers ($F_X$ and $F_Y$) and backward drivers ($B_X$ and $B_Y$). The output data from the A1 and A2 drivers are compared with the previous data count accumulated in the counter 60 in the $F_X$, $B_X$ logic 63 to set the polarity flip-flop $P_X$ and apply the appropriate drive pulse to the $F_X$ and $B_X$ drivers. Similarly, the pulse outputs from the A3 and A4 drivers are compared with the previous data count accumulated in the Y binary counter 61 in the $F_Y$, $B_Y$ logic 64 to set the polarity flip-flop $P_Y$ and apply appropriate drive pulses to the $F_Y$ and $B_Y$ drivers. In this manner, the X reversible counter 60 performs an algebraic addition of the output digital data from the X digital encoder 50 corresponding to the distance traveled by the stylus and the two states of the $P_X$ flip-flop register the $+$ and $-$ directions of travel of the stylus along the X axis of the tracing bed 15. Similarly, the reversible counter 61 performs an algebraic addition of the output digital data from the Y digital encoder 51 corresponding to the distance traveled by the stylus and the two states of the $P_Y$ flip-flop register the + and − directions of travel of the stylus along the Y axis of the tracing bed.

Each of the reversible binary counter stages are synchronized with the clock so that these counters continue to receive data for a given interval of time, e.g. 4 milliseconds. As described below, in the specific embodiment described, this period is advantageously twice the recording time required to record a character on the incremental tape recorder 37. Accordingly, the X binary counter 60 accumulates output digital data from the X digital encoder 50 corresponding to distance traveled by the stylus along the X axis during this given interval of time and the $P_X$ flip-flop of the accumulating means registers the direction of travel of the stylus during this given interval of time. Similarly, the Y binary counter 61 accumulates output data from the Y digital encoder 51 corresponding to distance traveled by the stylus along the Y axis during this interval of time and the $P_Y$ flip-flop registers the direction of travel of the stylus during this interval of time.

Periodically, after the given interval of time defined by the clock or at some other time as determined by the X or Y increment size selectors 31, 32 or the data point switch 33 as described below, the recorded value in each counter (respectively representing the algebraic sum of the X and Y increments) and each of the polarity flip-flops $P_X$, $P_Y$ (respectively representing the direction of stylus movement along the X and Y axes) are transferred to an output parallel register 70 in sync with the clock and written as first and second characters on the magnetic tape corresponding to the distance traveled and direction of travel of the stylus during the given interval of time.

The X and Y increment size selector switches 31, 32 are respectively operatively coupled to the X and Y incremental size selector logic stages 75, 76. These logic stages compare binary weighted states preselected by the switches with the states of the respective counters for inhibiting the transfer of the data in the counters and reset of the counters until the stylus has traversed a minimum distance preselected at the switches 31, 32. Thus, as shown, each switch includes plural positions respectively marked off in a plurality of different increment sizes: .01″, .02″, .04″, .08″ and .15″. Accordingly, if the X and Y switches are set at .01″, no data will be recorded until the stylus traverses .01″ in either the X or Y direction; similarly, if these switches are set at .15″, data is not recorded until the stylus traverses .15″ in the X or Y direction. Different increment sizes can be selected for X and Y so that, for example, data recording is inhibited until the X counter records an X translation of .08″ or the Y counter records a Y translation of .02″.

The data point switch 33 is coupled to the output register 70 and permits the operator to override the increment size selector logic. Regardless of the count stored in the counters 60, 61, when the operator actuates the switch 33, the data accumulated in the binary counters is transferred to the output register 70 and recorded at the recorder 37.

The variable increment selector 35 includes a first series of X toggle switches 80a, b, c, and d and a second series of Y toggle switches 81a, b, c, and d coupled to the variable increment programmer logic 77 for preselecting a maximum travel distance for the stylus during each recording period. Switches 80a–d and 81a–d preselect weighted binary states .08″, .04″, .02″ and .01″ at the logic 77. These states are compared with the states of the respective X and Y counters 60, 61 and produce respective output signals over leads 82, 83 to the speed error light 29 and an audio alarm 78 when the algebraic sum of the data from the digital encoder encodes a distance exceeding the preselected maximum distance. Consequently, when all of the X and Y toggle switches are actuated (to select a maximum increment of .01″+.02″ +.04″+.08″ or .15 inch) the sampling interval is .01 inch when the digitizer operator is tracing slowly. If the operator traces faster than a predetermined value, e.g. 150 inches per minute, but less than 300 inches per minute, the sampling interval is automatically set to 0.02 inch. If the operator increases tracing speed to 300 inches per minute, the digitizer changes the sampling interval to 0.03 inch. This operation continues until a maximum tracing speed of 2250 inches per minute (187 feet per minute) is reached. Any faster speed than this will cause the speed error signal to be applied to the light 29 and audio generator 78. Selecting a smaller maximum X and Y increment at the X and Y toggle switches has the effect of setting a minimum sampling rate with a correspondingly lower maximum digitizing rate.

The data hold switch 34 is coupled to both the $F_X$, $B_X$ and the $F_Y$, $B_Y$ logic stages 63, 64 and inhibits the flow of data therefrom to the $F_X$, $B_X$, $F_Y$, $B_Y$ driver stages while switch 34 is actuated.

STEP-BY-STEP OPERATING PROCEDURE

The graphical plot is mounted on the tracing bed 15 underneath the stylus 20. Power is turned on by actuating power switch 26 on the control panel 25. The mode selector switch 30 is then actuated to place the digitizer in the KEYBOARD mode. The electronic circuit logic and error indicators are then reset by entering a predetermined code on the manual entry keyboard 31. Magnetic tape is then loaded on the recorder 35 and the tape-drive control switch on the recorder control panel 39 is turned on. If the tape recorder is not properly loaded and ready to accept data, the record error indicator light 28 will be energized.

The identifier and scale-factor codes are then recorded on the magnetic tape by depressing the appropriate buttons on the manual entry keyboard. This code is determined by the particular digital computer for which the magnetic tape is being prepared.

The X and Y increment size selector switches 31 and 32 are preset by the operator to select the minimum increment size to be recorded as a character on the magnetic tape. The variable increment toggle switches 80a–d and 81a–d are also preset to select the maximum travel distance of the stylus which the operator desires for each given interval of time. The tracer stylus 20 is then positioned precisely over the beginning of the plot to be digitized. The mode selector switch 30 is then actuated to the TRACER position so as to place the digitizer in the TRACER mode. After assuring that the record error indicator 28 is not glowing (thus indicating that the tape drive is properly loaded and ready to accept data), the analog plot is traced by following the graphical data with the stylus.

FIGS. 3a and 3b illustrate the variable digitizing and sampling rates provided by the variable increment selector switch and logic. FIG. 3a shows a representative enlarged graphical analog plot 84 comprising a straight line AB along the X axis, a straight line BC along the Y axis, and a complex curve CD. This plot is overlaid, for purposes of illustration, with a grid composed of uniformly spaced lines respectively parallel to the X and Y axes representing the minimum increment size; hence, it will be seen that the graphical plot is considerably enlarged since the increment size for the embodiment described herein is 0.01 inch. The distances $R_1$, $R_2$, $R_3$, $R_4$ and $R_5$ are assumed to be the distances covered by the stylus as it traces the plot 84 during the successive recording periods $R_1$, $R_2$, $R_3$, $R_4$ and $R_5$.

With both of the increment size selector switches 31, 32 preset at 0.01 or 0.02 and the variable increment switches 80a–d and 81a–d set to 0.10 or greater, the data characters recorded on the magnetic tape 85 are shown in FIG. 3b. Thus, during the first recording period $R_1$, the stylus is translated ten increments in the +X direction. The polarity is so recorded in the first character as a binary "0" and the magnitude of displacement encoded therein by binary "1's" in the binary "8" and binary "2" positions. The second character encodes stylus movement along the Y axis. There being no movement therealong during the first recording period $R_1$, binary "0's" are recorded in each of the binary weighted positions 1, 2, 4 and 8. A binary "1" is shown in the polarity position and is so generated at the polarity flip-flop each time a zero increment is encoded to avoid recording a character made up entirely of binary "0's."

The next two characters encode the zero X increments and ten +Y increments for indicating the translation of the stylus from B to C.

The next six characters encode the movement from C to D and illustrate the variable sampling and digitizing rates as the tracing speed of the stylus, relative to the graphical data, is varied. Thus, during the recording interval $R_3$, it is assumed that the operator moved the stylus through +2X and +2Y increments during the recording period of 4 milliseconds, whereas during the period $R_5$, the operator moved the stylus through +8X increments and through +6Y−2Y or +4Y increments during an equivalent 4 milliseconds recording period while tracing the curve.

Thus, it will be seen that the digitizing and sampling rates are respectively proportional and inversely proportional to the tracing speed of the stylus, the lines AB and BC being digitized with sampling X and Y intervals of .1 inch and a digitizing rate of 1500 inches per minute, whereas the curve CD is digitized with respective sampling X and Y intervals of .02, .05 and .08 inch and respective digitizing rates of 300, 750 and 1200 inches per minute depending upon the distance traversed by the stylus in a given period of time.

This variable increment mode of operation provides for a substantial overall increase in digitizing rate without substantially impairing the accuracy of the digitization of most data plots. Thus, this feature allows a high digitizing rate on straight line sections, where the operator can accurately trace at a fast speed and the nature of the data is such that few samples are needed for an accurate digitization. However, on complex curves—where the operator must perforce slow down to accurately follow the graphical data—a high sampling rate is automatically achieved by reason of the reduced translation speed of the stylus.

FIGS. 3c and 3d illustrate the use of the increment size selection mode provided by the increment size selector switches 31, 32 and the use of the data point switch 33. In this example, a quadrilateral EFGH shown in FIG. 3c is digitized, the resultant recorded data being shown in FIG. 3d. Such a figure, formed by plural straight lines and defined by the respective locations of its vertices E, F, G and H, is quite common in analog graphical data, e.g. mechanical blueprints and property boundary maps.

In the specific example shown, both the X and Y increment size selector switches are set at .15 inch. This increment size (IS) is shown in the figure so that data is normally outputted only for a change of IS in either the X or Y directions, i.e. at points 86, 87, 88, 89, 90 and 91. If only these data samples are recorded, the digitizing of the data can be performed at a maximum digitizing rate while using a minimum of tape; however, the recorded data lacks considerable resolution as witness the figure resulting from connecting the respective points 86, 87, 88, 89, 90 and 91. However, the data point switch 33 permits the operator to obtain a very substantially higher resolution digitization without a substantial loss of operator time or use of substantial amounts of magnetic tape. Specifically, the data point switch permits the operator to additionally digitize the specific points E, F, G and H, thereby providing a digitization of the figure to the .01 inch resolution accuracy of the system. The data so produced (FIG. 3d) includes the accurate location of points 86, F, 87, 88, G, H, 92, 93 and E, a total of 18 characters, only 6 more than are required to record only the six points 86 to 91.

FIG. 3e illustrates the use of the data hold switch 34 with reference to the graphical data plot 94, including a first portion 95 and a second physically displaced portion 96 which is the curve between points K and O but was moved in order to stay within the confines of the chart edge 98. When recording such discontinuous data plots, the data is traced by the stylus from point J to point K in the ordinary manner. The data hold switch is then actuated and the stylus moved to point L. While being translated from point K to point L, all data produced by the digital encoder means corresponding to such translatory movement of the stylus relative to the data plot is inhibited from entering the counter. From point L to point M, the data hold switch is released and again actuated between point M to point O. Data is then recorded in the usual manner between points O and P. As a result, the only data recorded corresponds to the trace JK, LM and OP, without any discontinuity. Similarly, graphical plots much larger than the tracing bed 15 can be digitized merely by pushing the data hold button, shifting the plot and stylus and returning to the regular digitizing mode.

During the tracing mode, should the stylus be moved so rapidly so as to exceed in the given interval of time the maximum distance preset in the variable increment selector, an audible and visual alarm is given to the operator. Thus, if the distance of .04 inch is selected as the maximum travel distance in both the X and Y directions, a movement of the stylus greater than .04" in the given interval of time (typically 4 milliseconds) causes the light 29 to flash and the audio alarm to sound. Reference is made to the copending application entitled "Graphical Data Digitizer," supra in which is described and claimed a system for quickly and accurately correcting errors by means of an Inter-Record-Gap entered on the magnetic tape by depressing an IRG button in the manual entry keyboard 36. This system is also advantageously incorporated in digitizers constructed in accordance with the present invention.

When the entire graphical plot is completed, the keyboard mode is again initiated by actuating button 30 to the keyboard position and a suitable E.O.F. code indicating the end of file is selected on the manual entry keyboard 36.

DETAILED DESCRIPTION OF THE DIGITIZER SYSTEM

Graphical data follower means

The stylus 20 as shown in FIGS. 4 and 5, comprises a generally rectangular plate 100 of a clear transparent material such as acrylic or polystyrene. The stylus is adapted to be rapidly and precisely moved over the graphical record. Toward this end, a vertically extending lever 101 is affixed to plate 100. This lever is grasped by the operator in the manner of a pencil or pen and the graphical record traced in close approximation to moving the pencil or pen in normal writing fashion. A support member 102 of Teflon resin material or the like is attached to the bottom of the stylus for resting the stylus on the upper face of the tracing bed 15 or directly upon the sheet of graphical data located thereon. A plastic insert 103 extends through an aperture in plate 100 and has a sighting crosshair 104 inscribed and inked on its bottom face. As shown in FIG. 5, this crosshair is located closely proximate the surface of the graphical data thereby eliminating parallax.

The carriage assembly is illustrated in FIGS. 4 and 6 and includes L-shaped brackets 110 and 111 respectively connected at opposite ends of the rod 21. A single guide wheel 112 having an annular groove around its circumference is rotatably mounted about its vertical axis to bracket 110 in an in-line position with respect to rod 21. Guide wheel 112 engages a guide rod 113 which extends along substantially the entire length of the upper side of the tracing bed 15. A pair of similar guide wheels, of which only one 115 is shown, are rotatably mounted to bracket 111 about their respective vertical axes in respective positions on opposite sides of the rod 21. These latter guide wheels engage a guide rod 117 which extends along substantially the entire length of the lower side of the tracing bed 15. This guide wheel pair and guide wheel 112 locate the rod 21 in a plane parallel with respect to the surface of the tracing bed 15 and support the rod for transverse movement across the tracing bed.

The stylus plate 100 is affixed to a movable housing 118 which is advantageously supported by a pair of ball bushings for translation along the length of the rod 21.

Linkage coupling the carriage assembly to the digital encoder means

Movement of the rod 21 along the X and Y axes is converted into digital data by the X axis digitizing armature 120 and the Z axis digitizing armature 121. As shown in FIG. 4, the X axis armature 120 is connected to an input rotatable shaft 122 and rotatably juxtaposed three variable magnetic reluctance pickoff heads T1, T2 and T3. Similarly, the Z axis armature 121 is connected to an input rotatable shaft 123 and rotatably juxtaposed three pickoff heads T4, T5 and T6.

The linkage coupling rod 21 to the X axis input shaft 122 includes flexible cable segment 125. As shown, cable 125 is secured to horizontally extending cable support leg 126 of bracket 110. This segment passes around the vertically mounted pulley 127 located at the upper right corner of the tracing bed, then two times around the input shaft 122, across to a horizontally mounted pulley 129 located at the lower left edge of the tracing bed, around a vertically mounted pulley 130 also located at the lower left edge of the tracing bed, to a horizontally extending cable support leg 131 of bracket 111.

Another cable segment 125' is attached to a horizontally extending cable support leg 132 of bracket 111. The cable 125', fastened at one end to support leg 132, passes around a vertically mounted pulley 133, then around a horizontally mounted pulley 134 at the lower edge of the tracing bed 15, over to another horizontally mounted pulley 135 located at the upper right end of the tracing bed, across to a vertically mounted pulley 136 located at the upper left edge of the tracing bed, and back across to a horizontally extending support leg 137 of bracket 110 where the end of the wire cable 125' is secured.

It will be observed that as the rod 21 is translated in the direction of arrow 140, the cable segment 125' will cause the digitizing X axis armature 120 to rotate in the direction of arrow 141 (clockwise as viewed from the rear of the digitizer). Likewise, movement of the rod 21 in the opposite direction across the tracing bed will cause the armature 120 to turn in a counter-clockwise direction as viewed from the rear of the instrument.

Housing 118 is coupled to the Z axis input rotational shaft 123 by a substantially continuous cable 145 having one end connected to housing 118. This cable passes around pulley 150 horizontally mounted to a horizontally extending support leg 151 of bracket 110. The cable then passes around a vertically mounted pulley 152, across to shaft 123 where it is wrapped around two times, to another vertically mounted pulley 153, back to pulley 154 horizontally mounted to a horizontally extending leg of bracket 110, through a slot in housing 118 to pulley 160 horizontally mounted to bracket 111, and back to housing 118 to which it is secured. In the specific embodiment described herein, the diameter of the X and Z input shaft relative to the digitizer armature is such that a pulse output is produced for each 0.005 inch movement in the X or Y directions.

It will be observed that as the housing 118 is translated along the rod in either direction of the Y axis, the Z axis encoder armature 121 will be caused to rotate. Furthermore, translation of the rod across the tracing bed produces a corresponding rotation of the armature 121. Accordingly, the rotation of the encoder armature 121 comprises both X and Y information and is defined by the equation $$Z = X + Y \qquad (1)$$

As described below, the Z displacement is translated into Y axis data by combining the outputs of the X axis and Z axis encoders and solving the equation $$Y = Z - X \qquad (2)$$

Digitizing armature and pickoffs

Figure 7:
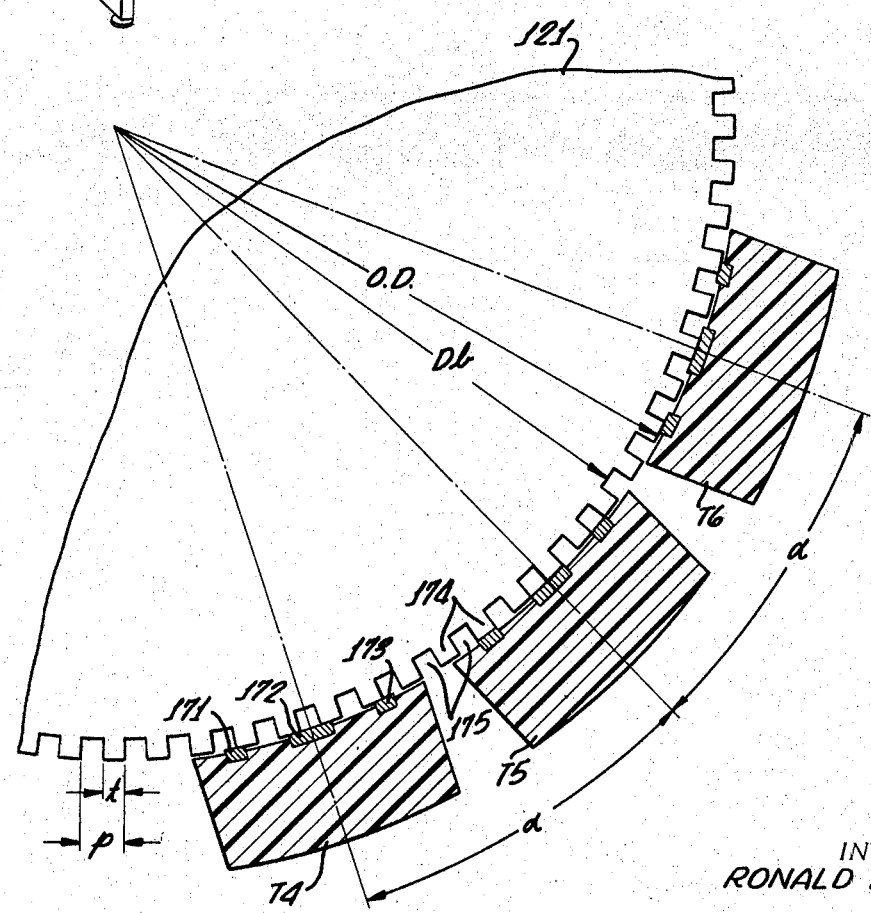
FIG. 7 is an enlarged fragmentary view of a digitizing armature and pickoff assembly.

An enlarged view of the Z axis encoder armature wheel 121 and associated pickoffs T4, T5 and T6 is shown in FIG. 7. An enlarged view of the windings of pickoff T4 is shown in FIG. 8. The X axis armature and pickoffs T1, T2, and T3 have a similar structural configuration. Each pickoff includes an E-shaped magnetic core 170 having respective pole faces 171, 172 and 173. These pole faces cooperate with the regularly spaced teeth 174 and airgaps 175 of the armature 121 to provide output signals indicative of the direction and magnitude of movement of the armature relative to the fixed pickoffs.

The pickoffs are respectively displaced from one another through 120 electrical degrees, where the complete cycle of the electrical output of any one head is considered to be 360°. The relative positions of the respective heads and relative dimensions of the pole faces and teeth on the encoding wheel are shown diagrammatically in FIG. 7. Each of the outer pole faces 171 and 173 have a width corresponding to the thickness ($t$) of the teeth 174, whereas each of the inner pole faces 172 has a width corresponding to the circular pitch ($p$) which is twice the distance $t$. Further, the pole face 172 is spaced from the other faces 171 and 173 by the pitch distance ($p$).

The electrical displacement of 120° between pickoffs is provided by offsetting the pickoff T5 through a distance of ⅓ $p$ with respect to T4 and displacing pickoff T6 a distance of ⅔ $p$ with respect to pickoff T4, as shown. This displacement is provided by suitably arranging the pickoffs so that their center axes are displaced by an angle $\alpha$ as shown in FIG. 7.

As shown in FIG. 8, the stationary portion of each pickoff advantageously comprises an E-shaped laminated core 170 having outside legs 180, 181 respectively providing the pole face 172. A primary winding 183 is wound on the inside leg 182 and secondary windings 183 and 184 are respectively wound on the outside legs 180, 181. The primary winding 183 is connected to the input $T_P$ terminals and the secondary windings 183 and 184 are connected in series opposition to output terminals $T_S$.

In operation, the core 170, encoder armature 121 and primary and secondary windings provide a pulse transformer in which the magnetic reluctance path is varied between the primary leg and respective secondary legs as the position of the armature 121 is varied. Thus, it will be seen in FIG. 8 that in the position shown, the maximum amount of iron of armature 121 bridges the gap between secondary leg 181 and primary leg 182. Accordingly, a current $i_I$ produced by a pulse supplied to the terminals $T_P$ produces a flux $\phi$ as shown, which in turn induces an EMF in the secondary winding 184 causing the current $i_O$ to flow in the direction shown through the load attached to the output terminals $T_S$. A current in the opposite direction is produced as the encoder armature 121 is translated through one-half pitch in either direction. In the encoding system described herein, only the positive going pulse output of the pickoff is utilized for detecting stylus movement.

The system clock

Figure 9:
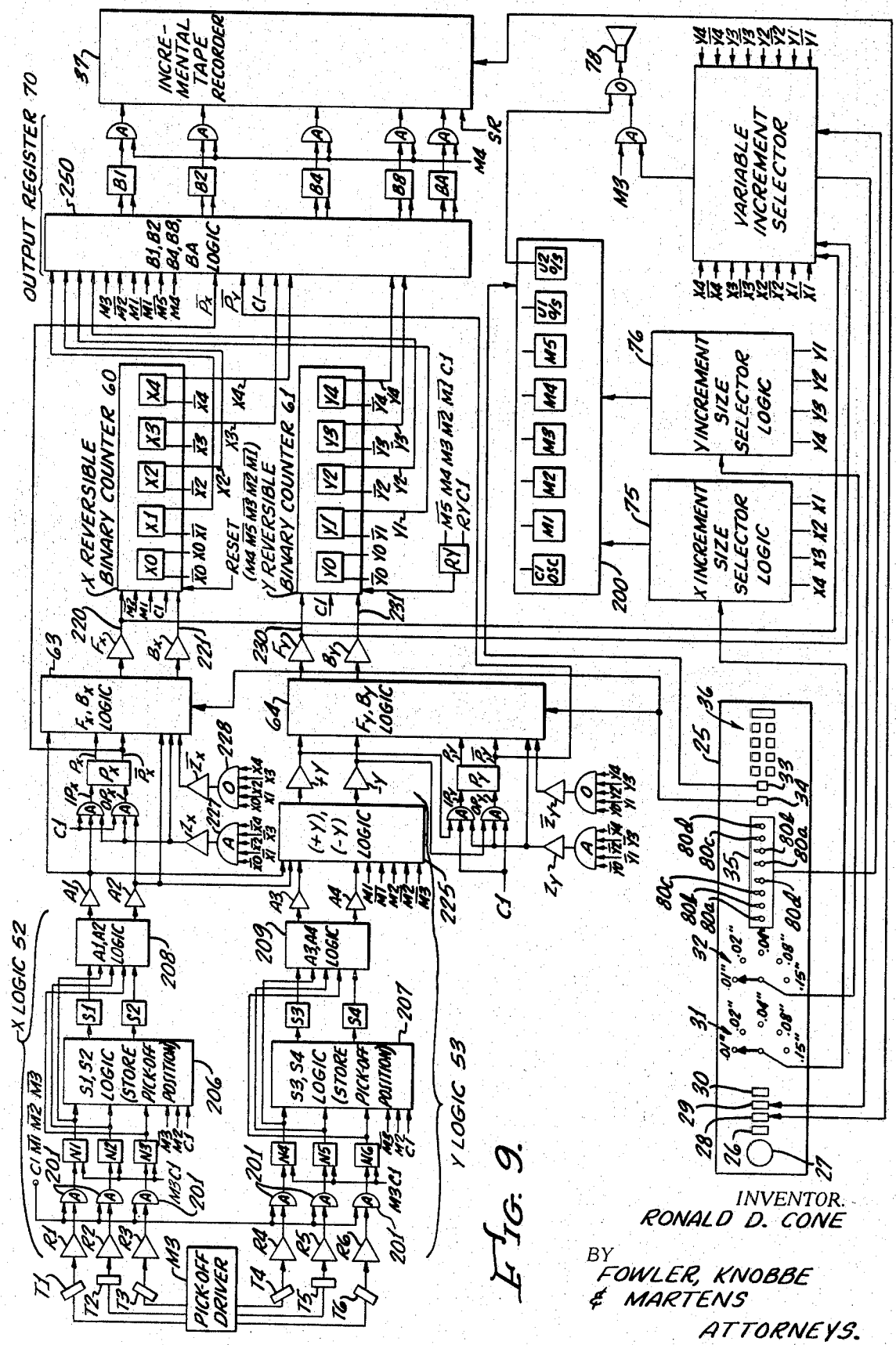
FIG. 9 is a detailed block diagram of the entire digitizer system.

Referring to FIG. 9, the timing generator on clock 200 comprises a C1 oscillator, a series of flip-flops M1, M2, M3, M4 and M5 and a pair of one-shot multivibrators U1 and U2. The timing pulses produced by the clock are respectively shown in FIGS. 10 and 11 and the logic equations defining the interconnections between the C1 oscillator and the other elements are as follows:

$$1M1 = \overline{M1}\, C1 \tag{3}$$
$$0M1 = M1\, C1 \tag{4}$$
$$1M2 = M1\, \overline{M2}\, C1 \tag{5}$$
$$0M2 = M1\, M2\, C1 \tag{6}$$
$$1M3 = M1\, M2\, \overline{M3}\, C1 \tag{7}$$
$$0M3 = M1\, M2\, M3\, C1 \tag{8}$$
$$1M4 = (LD\, \overline{M5} + M5)\, \overline{U1}\, \overline{U2}\, M3\, \overline{M2}\, \overline{M1} C1 \tag{9}$$
$$0M4 = M4\, M3\, \overline{M2}\, \overline{M1}\, C1 \tag{10}$$
$$1M5 = \overline{M5}\, M4\, M3\, \overline{M2}\, \overline{M1}\, C1 \tag{11}$$
$$0M5 = M5\, M4\, M3\, \overline{M2}\, \overline{M1}\, C1 \tag{12}$$
$$1U1 = \overline{M5}\, M4\, C1 \tag{13}$$
$$1U2 = M5\, M4\, C1 \tag{14}$$

The term LD in the 1M4 equation is determined by the X and Y increment size selectors 75 and 76 as described below.

Figure 11:
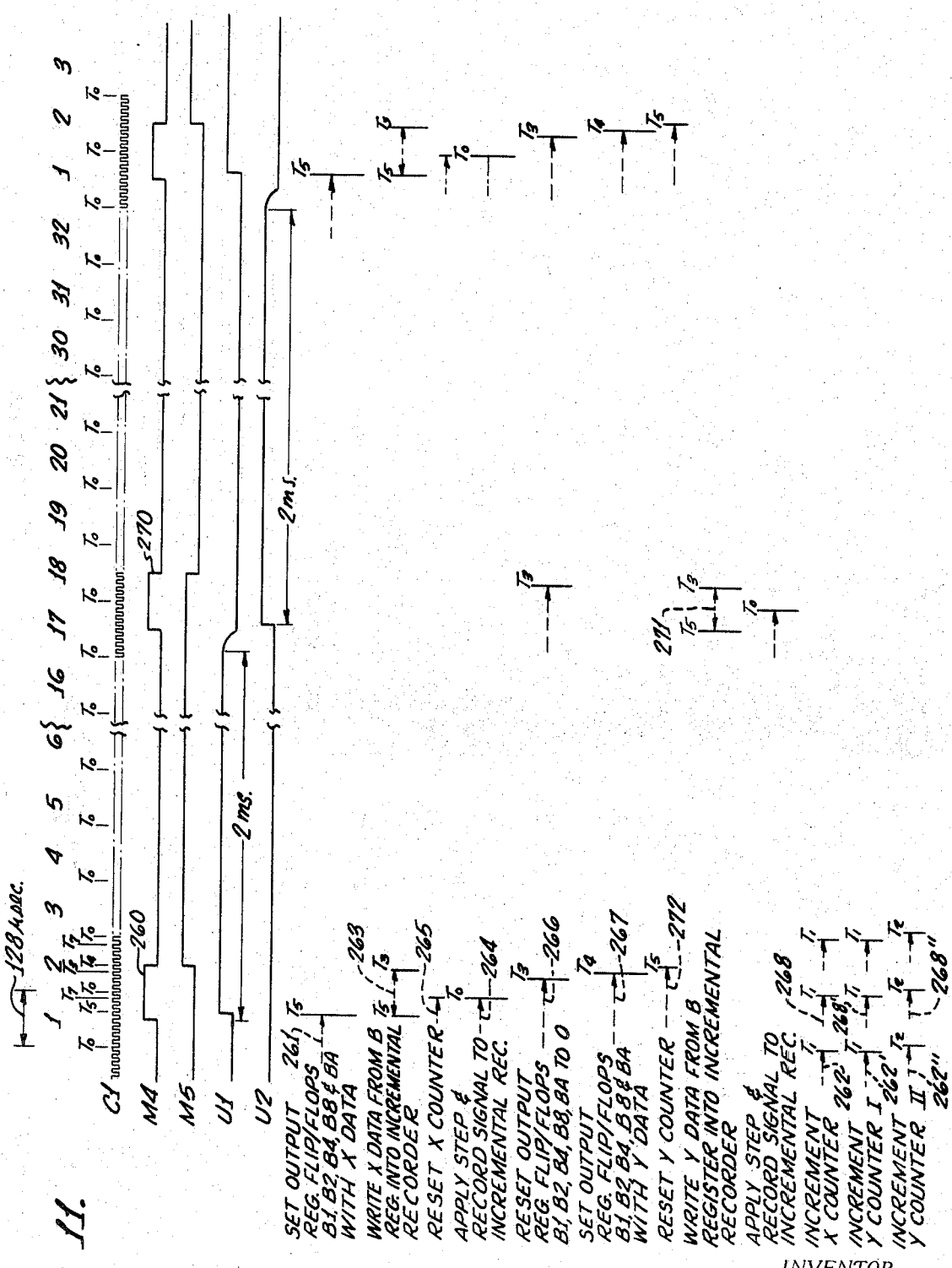
FIG. 11 is a timing diagram illustrating the recording period and the timing of the counting, output store and recording functions performed during this period.

As shown in FIG. 10, a complete cycle of M3, termed herein as the digitizing period, is divided into eight equal time periods labeled $T_0, T_1 \ldots T_7$ by the timing signals C1, M1, M2 and M3. Typically, the period of waveform of M3 is 128 microseconds. These signals control the digital encoder means and binary counter means. FIG. 11 illustrates the timing periods M4, M5, U1 and U2 used for transferring the accumulated data from the counters to the output register 70 and into the incremental magnetic tape recorder 37. The period of M5 defined herein as the recording period, includes a plurality of digitizing periods, e.g. 32 as shown in FIG. 11. As described below, the length of the recording period is generally determined by the time required for the recorder to record the X and Y characters.

Digital encoder means

Pickoff Driver.—Referring now to FIG. 9, the pickoff driver stage is connected to the M3 clock function so that each of the pickoffs $T_1, T_2$, etc. are pulsed by the trailing edge of each M3 pulse. The waveform and timing of the pickoff driver is shown at 200 in FIG. 10. The secondary windings of each of these pickoffs are respectively connected to the inputs of read amplifiers R1, R2, R3, R4, R5 and R6.

Present Position—The N Flip-Flops.—Flip-flops N1, N2, N3, N4, N5 and N6 are respectively responsive to read amplifiers R1, R2, R3, R4, R5 and R6. These flip-flops respectively store the output states of the read amplifiers at a particular instant of time defined by the clock function C1 $\overline{M1}\, \overline{M2}\, \overline{M3}$. As shown in FIG. 10, this function is delayed a short time after the trailing edge of M3. As a result, the outputs of each of the read amplifiers are read a fixed time subsequent to the trailing edge of the clock M3.

The synchronized reading of the pickoffs is accomplished as shown in FIG. 9 by a series of AND gates 201 interposed between the outputs of the read amplifiers and the set inputs of the respective N flip-flops. The AND gate circuitry as shown in FIG. 8 mechanizes the following logical equations:

$$1N1 = R1\, (\overline{M3}\, \overline{M2}\, \overline{M1})\, C1 \tag{15}$$
$$0N1 = M3\, C1 \tag{16}$$
$$1N2 = R2\, (\overline{M3}\, \overline{M2}\, \overline{M1})\, C1 \tag{17}$$
$$0N2 = M3\, C1 \tag{18}$$
$$1N3 = R3\, (\overline{M3}\, \overline{M2}\, \overline{M1})\, C1 \tag{19}$$
$$0N3 = M3\, C1 \tag{20}$$
$$1N4 = R4\, (\overline{M3}\, \overline{M2}\, \overline{M1})\, C1 \tag{21}$$
$$0N4 = M3\, C1 \tag{22}$$
$$1N5 = R5\, (\overline{M3}\, \overline{M2}\, \overline{M1})\, C1 \tag{23}$$
$$0N5 = M3\, C1 \tag{24}$$
$$1N6 = R6\, (\overline{M3}\, \overline{M2}\, \overline{M1})\, C1 \tag{25}$$
$$0N6 = M3\, C1 \tag{26}$$

Each of the N flip-flops set at the beginning of a digitizing period are reset at time $T_4$ by the clock function $\overline{M3}\, C1$.

The respective states of the N flip-flops as the encoder armature is caused to rotate, are illustrated in FIG. 12. It will be understood that a similar illustration can be drawn for the states of the N4, N5 and N6 flip-flops associated with the Z axis encoder. As shown in FIG. 12, each of the flip-flop states is displaced one from the other by an electrical displacement of 120°. This displacement is produced by the physical displacement of the pickoff heads as described hereinabove.

The three states produced by the X pickoffs are utilized to provide information concerning the present position of the encoder armature in the following manner: Assume that the electrical distance corresponding to the pitch of the teeth of the encoder armature is divided into six equal intervals so as to provide state 1, state 2, state 3, state 4, state 5 and state 6, as shown in FIG. 10. Each of these six states is unique. Thus, state 1 is defined by N1 N2 $\overline{N3}$; state 2 is defined by N1 $\overline{N2}$ $\overline{N3}$; state 3 is defined by N1 $\overline{N2}$ N3; state 4 is defined by $\overline{N1}$ $\overline{N2}$ N3; state 5 is defined by $\overline{N1}$ N2 N3; and state 6 is defined by $\overline{N1}$ N2 $\overline{N3}$. It will be apparent that as the encoder armature is caused to move in the direction of arrow 205, it will result in a change from state 1 to state 2 to state 3 to state 4 to state 5 to state 6, and back to state 1 so long as the rotational advancement of the armature does not progress through the states at a rate faster than the period of the clock M3. Similarly, as the encoder armature is caused to move in the reverse direction of arrow 205, there will be a change in state 1 to state 6 to state 5 to state 4 to state 3 to state 2 and back to state 1.

Previous position—the S flip-flops.—During the translation of the pickoff data, the pickoff position is temporarily stored in flip-flops S1, S2, S3 and S4. A combination of flip-flops S1 and S2 and their associated input logic 206 provides four unique states for storing any position of the X axis encoder armature. Similarly, the combination of flip-flops S3 and S4 and their associated input logic 207 provides four unique states for storing any position of the Z axis encoder armature.

As noted above, the N flip-flops provide six unique states. However, as described and claimed in the copending application entitled "Graphical Data Digitizer," supra, the states labeled 2, 4 and 6 above are not used in order to leave dead zones between the active states 1, 3 and 5 and thus require a definite movement of the stylus and resultant movement of the armature in order to initiate an incremental change in the positive or negative direction. The three remaining states, 1, 3 and 5 are stored by the combination of flip-flops S1 and S2 and their associated input logic 206 as follows:

$$\text{State } 1 = N1\, N2\, N3 = S1 \text{ or } \overline{S2} \tag{27}$$
$$\text{State } 3 = N1\, \overline{N2}\, N3 = \overline{S1} \text{ or } S2 \tag{28}$$
$$\text{State } 5 = \overline{N1}\, N2\, N3 = S2 \text{ and } S3 \tag{29}$$

The logical equations defining the structure and function of the input logic 206 of the S1 and S2 flip-flops for achieving these states are as follows:

$$1S1 = [N1 + N3]\, N2\, (\overline{M3}\, M2\, C1) \tag{30}$$
$$0S1 = N1\, N3\, (\overline{M3}\, M2\, C1) \tag{31}$$
$$1S2 = [N1 + N2]\, N3\, (\overline{M3}\, M2\, C1) \tag{32}$$
$$0S2 = N1\, N2\, (\overline{M3}\, M2\, C1) \tag{33}$$

Similar unique states are provided by the S3 and S4 flip-flops for storing the prior states or Z axis encoder armature. The logic equations defining the structure of the input logic 207 of these flip-flops are as follows:

$$1S3 = [N4 + N6]\, N5\, (\overline{M3}\, M2\, C1) \tag{34}$$
$$0S3 = N4\, N6\, (\overline{M3}\, M2\, C1) \tag{35}$$
$$1S4 = [N4 + N5]\, N6\, (\overline{M3}\, M2\, C1) \tag{36}$$
$$0S4 = N4\, N5\, (\overline{M3}\, M2\, C1) \tag{37}$$

As shown in logic Equations 30, 32, 34 and 36 and in the timing diagram of FIG. 10, the S flip-flops are set or reset to the requisite states at time $T_2$, a predetermined time period subsequent to the setting of the N flip-flops. The respective states of the S flip-flops are then held until time $T_2$ of the following digital period.

Decoding of magnitude and polarity of movement of X and Z axis encoders.—Information concerning the movement and direction of movement of the X and Z encoders is obtained by comparing in each digitizing period the present position of the encoder as stored in the N flip-flops with the position which it held in the previous digitizing cycle as stored in the S flip-flops. Thus, referring again to FIG. 12, movement of the encoder armature in the direction of the arrow 205 is a change from state 1 to state 2 to state 3 to state 4 to state 5 to state 6 and back to state 1. Similarly, movement in a direction reverse to that of arrow 205 is a change in state 1 to state 6 to state 5 to state 4 to state 3 to state 2 and back to state 1. As noted above, states 2, 4 and 6 are not used. Accordingly, the positive incremental movement in the X direction ($P_X$) is defined by the following equation:

$$P_X = (1 \rightarrow 3) + (3 \rightarrow 5) + (5 \rightarrow 1) \quad (38)$$

$$N_X = (3 \rightarrow 1) + (5 \rightarrow 3) + (1 \rightarrow 5) \quad (39)$$

where the numbers 1, 3 and 5 in both sets of Equations 38 and 39 refer to the states 1, 3 and 5 shown in FIG. 12. It will be noted that Equations 38 and 39 are based upon the availability of information as to both a past and present position of the encoder armature. Thus, defining a positive change in X as translating from state 1 to state 3 means that it is necessary to store the position at state 1 and compare this state with the position at state 3. Likewise, if the armature should be rotated in the opposite direction, it would be necessary to compare state 5 with state 1.

Simlarly, a negative movement in the X direction is defined as follows:

The requisite data storage for obtaining digital data representing the magnitude and polarity of stylus movements in the X direction is provided for the X axis encoder by the S1 and S2 flip-flops and associated logic circuitry interconnecting these flip-flops with the outputs of the N and N2 flip-flops. Accordingly, states of both the S and N flip-flops corresponding to respective positions of the encoders can be substituted into Equations 38 and 39, allowing the following equations to be written defining positive and negative movement in the X direction:

$$P_X = \overline{S2}\, N1\, N3 + \overline{S1}\, N2\, N3 + S1\, S2\, N1\, N2 \quad (40)$$

$$N_X = \overline{S1}\, N1\, N2 + S1\, S2\, N1\, N3 + \overline{S2}\, N2\, N3 \quad (41)$$

where the N outputs represent the new position of the encoder armature and the S outputs represent a previous position of the encoder armature stored in the S flip-flops.

Equations 40 and 41 are mechanized in the A1, A2 logic 208 to provide outputs at the A1 and A2 drivers corresponding to +X and −X incremental movements. The structure and function of the A1, A2 logic is defined by the following logic equations:

$$1A1 = \overline{S2}\, N1\, N3 + \overline{S1}\, N2\, N3 + S1\, S2\, N1\, N2 \quad (42)$$

$$1A2 = \overline{S2}\, N2\, N3 + \overline{S1}\, N1\, N2 + S1\, S2\, N1\, N3 \quad (43)$$

which are respectively identical with the Equations 40 and 41.

Similar equations corresponding to plus and minus incremental movements in the Z direction can be written as follows for the N4, N5, N6 and S3, S4 flip-flops:

$$1A3 = \overline{S4}\, N4\, N6 + \overline{S3}\, N5\, N6 + S3\, S4\, N4\, N5 \quad (44)$$

$$1A4 = \overline{S4}\, N5\, N6 + \overline{S3}\, N4\, N5 + S3\, S4\, N4\, N6 \quad (45)$$

these equations defining the circuitry of the A3, A4 logic 209.

Accumulator means

X country, $P_X$ flip-flop and associated logic.—The function of the X counter is to count algebraically each incremental movement of the X axis encoder armature. In the specific embodiment shown, counter 60 includes a first input 220 for receiving those increments to be added in the forward direction and a second input 221 for receiving those increments to be added in the backward direction (i.e. subtracted from the data already accumulated). Pulses corresponding to these movements are supplied as inputs to the $F_X$ and $B_X$ drivers from the $F_X$, $B_X$ logic 63.

Polarity sensing is accomplished by the $P_X$ flip-flop and its associated logic. Thus, as shown, the set input of the $P_X$ flip-flop is defined by the logic equation $$1P_X = A1_X C1 \quad (46)$$

where $$U_X = \overline{X4}\, \overline{X3}\, \overline{X2}\, \overline{X1}\, \overline{X0} \quad (47)$$

and is supplied by AND gate 227 and the $Z_X$ driver. Accordingly, the $P_X$ flip-flop is set to its binary 1 state (indicative of a + movement of the stylus along the X axis) at the end of a clock C1 pulse if the X counter then registers zero and a signal is received at the output of the A1 driver indicative of a movement in the +X direction. This state is maintained until the $P_X$ flip-flop is changed to its binary "0" state (indicative of a − movement of the stylus along the X axis). The reset logic circuitry is also shown in FIG. 8 and defined by the equation $$0P_X = A2 Z_X C1 \quad (48)$$

Thus, the $P_X$ flip-flop is changed to its binary "0" at the end of a clock pulse C1 when there is a zero count then registered in a counter and a signal at the output of the A2 driver indicative of a movement in the −X direction.

The function and structure of the $F_X$, $B_X$ logic 63 is defined by the following logic equations:

$$1F_X = [P_X\, A1 + \overline{P}_X\, A2 + Z_X\, A1 + Z_X\, A2] \overline{DH} \quad (49)$$

$$1B_X = [P_X\, A2 + \overline{P}_X\, A1]\, \overline{Z}_X\, \overline{DH} \quad (50)$$

where $$\overline{Z}_X = X4 + X3 + X2 + X1 + X0 \quad (51)$$

and is produced by OR gate 228 and the $\overline{Z}_X$ driver, and $\overline{DH}$ represents the data hold switch 33 in its non-actuated state. Considering first the logic for the forward driver $F_X$, a signal is applied to its input when any one of four conditions are true. These conditions may be verified by reference to the truth table of FIG. 13 and comprise $P_X A1$, the condition in which the data accumulated in the counter is positive (representing +X movement and a signal is received at the output of the A1 driver indicative of an additional increment of movement in the +X direction, $\overline{P}_X A2$, the condition wherein the data accumulated in the counter is negative (representing −X movement) and a count is received at the output of A2 driver indicative of an additional increment of movement in the −X direction; $Z_X A1$, the condition in which the counter was previously zero and a movement is obtained in the +X direction; and, $Z_X A2$, the condition in which the counter was previously zero and a movement is indicated in the −X direction.

Similarly, the counter receives a signal on its backward input lead 221 from the output of the $B_X$ driver when either one of the two conditions are satisfied; $P_X A2 \overline{Z}_X$, the condition wherein the data accumulated in the counter is positive, the counter contains a number other than zero and a signal is received at the output of the A2 driver indicative of movement in the −X direction. The other condition of the backward movement is defined by the term $\overline{P}_X A1 \overline{Z}_X$, the condition wherein the accumulated data is negative, the counter contains some number other than zero and a signal is received at the output of the A1 driver indicative of movement in the +X direction.

The data appearing at the output of the $F_X$ and $B_X$ drivers is incremented into the first stage $X_0$ of the reversible binary counter 60 at time $T_1$ ($\overline{M2}$ M1 C1) as shown in the timing diagram of FIG. 10. Referring to FIG. 9, counter 60 comprises five flip-flops X0, X1, X2, X3 and X4 for serially accumulating the X data and performing an algebraic addition thereof. Advantageously, these flip-flops are known in the art as T flip-flops, i.e. flip-flops which are triggered to their opposite state each time an input pulse is applied thereto. When these flip-flops are used, the logic interconnections between the respective flip-flops are made in accordance with the following logic equations:

$$\Delta X0 = (F_X + B_X) \overline{M2}\, M1\, C1 \tag{52}$$

$$\Delta X1 = (X0\, F_X + \overline{X0}\, B_X) \overline{M2}\, M1\, C1 \tag{53}$$

$$\Delta X2 = (X1\, X0\, F_X + \overline{X1}\, \overline{X0}\, B_X) \overline{M2}\, M1\, C1 \tag{54}$$

$$\Delta X3 = (X2\, X1\, X0\, F_X + \overline{X2}\, \overline{X1}\, \overline{X0}\, B_X) \overline{M2}\, M1\, C1 \tag{55}$$

$$\Delta X4 = (X3\, X2\, X1\, X0\, F_X + \overline{X3}\, \overline{X2}\, \overline{X1}\, \overline{X0}\, B_X) \overline{M2}\, M1\, C1 \tag{56}$$

where $\Delta X0$, etc. indicates a respective change in state of the flip-flop.

Counter 60 is reset following transfer of the accumulated data to the output register 70 by applying ground potential to each of the binary "0" outputs of the counter flip-flop stages, thereby forcing them to return to their binary "0" states. This function will be described in further detail below.

The five stages X0 to X4 of counter 60 are capable of registering any number of data bits between 0 and 31, each bit corresponding to an incremental 0.005 inch movement of the stylus. This provides the capability of selecting a system resolution of 0.005 or 0.01 inch. In the specific embodiment described herein, the recorded character includes a maximum of four bit positions for encoding the magnitude of the variable increment (plus one bit position for polarity and an extra bit position for a keyboard code insert. For this reason, the output data is taken from the output counter stages X1, X2, X3 and X4, as described below in conjunction with the output register and its logic Equations 70–77, whereas the data contained in the least signficant stage X0 is discarded. When an overall system resolution of 0.01 inch is desired, all five stages are used, but only X1, X2, X3 and X4 are read, thereby encoding a maximum increment size of 0.15 inch. When an overall system resolution of 0.005 inch is desired, the first stage X0 is bypassed, thereby dividing in half the counter capacity so that a maximum increment size of 0.075 inch can be encoded.

Y counter, $P_Y$ flip-flop, $+Y$, $-Y$ drivers and associated logic.—The $+Y$ and $-Y$ logic 225 translates the displacement of the Z and X axis encoder armatures into translation of the stylus along the Y axis of the plotting board in accordance with Equation 2 above. As shown in the table of FIG. 14, the $+Y$, $-Y$ logic is clocked so as to supply outputs at two distinct times $T_1$ and $T_2$ during each digitizing period. The two incrementing states I and II provide for a double count in modes 5 and 7 of Equation 14 since in these two respective modes the respective binary values of X and Z are such as to necessitate a value of two for Y. The mechanization and function of the logic for providing this result is defined by the following basic equations:

$$+Y = [(A2\, \overline{A4} + \overline{A1}\, \overline{A2}\, A3)\, \overline{M2}\, M1 \\ + A3\, A2\, M2\, \overline{M1}]\, \overline{M3} \tag{57}$$

$$-Y = [\overline{A2}\, A4 + A1\, \overline{A3}\, \overline{A4})\, \overline{M2}\, M1 \\ + A1\, A4\, M2\, \overline{M1}]\, \overline{M3} \tag{58}$$

Thus, it will be seen that the first two terms of Equation 57 define the modes 2, 3 and 5 at time $T_1$ ($\overline{M2}$ M1 $\overline{M3}$), whereas the third term defines mode 5 at time $T_2$ (M2 $\overline{M3}$ $\overline{M1}$); and the first two terms of Equation 58 define the modes 1, 6, 7 at time $T_1$ and the third term defines mode 7 at time $T_2$.

As in the case of the X counter, the function of the Y counter 61 is to count algebraically each forward or backward movement of the stylus along the Y axis. In the specific embodiment shown, counter 61 includes a first input 230 for receiving increments in the forward direction and a second input 231 for receiving increments in the backward direction. Pulses corresponding to these movements are supplied as inputs to the $F_Y$ and $B_Y$ drivers from the $F_Y$, $B_Y$ logic 64. Polarity sensing with the $P_Y$ flip-flop and the function and structure of the $F_Y$, $B_Y$ logic is analogous to that of the $P_X$ flip-flop and $F_X$, $B_X$ logic described above and is defined by the following logic equations:

$$1P_Y = (+Y)\, Z_Y\, C1 \tag{59}$$

$$0P_Y = (-Y)\, Z_Y\, C1 \tag{60}$$

where $$Z_Y = \overline{Y4}\, \overline{Y3}\, \overline{Y2}\, \overline{Y1}\, \overline{Y0}; \tag{61}$$

$$1F_Y = [(P_Y + Z_Y)\, (+Y) + (\overline{P_Y} + Z_Y)\, (-Y)]\, DH; \tag{62}$$

$$1B_Y = [(P_Y)\, (-Y) + (\overline{P_Y})\, (+Y)]\, (\overline{Z_Y})\, DH \tag{63}$$

where $$Z_Y = Y4 + Y3 + Y2 + Y1 + Y0 \tag{64}$$

The Y counter similarly includes five T flip-flops Y0, Y1, Y2, Y3 and Y4 whose interconnections are defined by the following logic equations:

$$\Delta Y0 + (F_Y + B_Y)\, C1 \tag{65}$$

$$\Delta Y1 = (Y0\, F_Y + \overline{Y0}\, B_Y)\, C1 \tag{66}$$

$$\Delta Y2 = (Y1\, Y0\, F_Y + \overline{Y1}\, \overline{Y0}\, B_Y)\, C1 \tag{67}$$

$$\Delta Y3 = (Y2\, Y1\, Y0\, F_Y + \overline{Y2}\, \overline{Y1}\, \overline{Y0}\, B_Y)\, C1 \tag{68}$$

$$\Delta Y4 = (Y3\, Y2\, Y1\, Y0\, F_Y + \overline{Y3}\, \overline{Y2}\, \overline{Y1}\, \overline{Y0}\, B_Y)\, C1 \tag{69}$$

Although the Y counter is incremented plural times for each digitizing period of the clock C1, it will be apparent from Equations 56 and 57 above that the $+Y$ and $-Y$ drivers are energized only at times $T_1$ and $T_2$ so that no data is available at the outputs of the $F_Y$ and $B_Y$ drivers at any time other than times $T_1$ and $T_2$.

The Y counter 61 is reset by the $P_Y$ flip-flop following transfer of the accumulated data for the output register. This reset function is described in further detail hereinafter.

Recording the data

The recording period.—Periodically, the data accumulated in each of the binary counters 60, 61 is transferred to the output register 70 comprising respective flip-flops B1, B2, B4 and B8 and driver BA. The recording period, shown in FIG. 11, is determined by the M4, M5, U1 and U2 stages of the clock. As noted hereinabove, the U1 and U2 stages are one-shot flip-flops designed to produce respective output pulses of 2 milliseconds time duration when triggered. The complete recording interval is essentially divided up into a first portion whose length is determined by firing time of one-shot U1 and a second portion whose length is determined by the firing time of U2. In this manner, each of the one-shots enjoys an off time of approximately two milliseconds so as to have sufficient time to recharge its capacitive element. In addition, the staggered U1, U2 pulses provide for conveniently generating an M4 pulse both at the beginning of the recording interval and in the middle thereof for controlling the output register 70 and the writing of data therefrom into the digital recorder.

It is to be noted that the recording period need not encompass an exact number of digitizing periods. Rather, the respective time periods provided by the one-shots U1 and U2 should be long enough so that the tape recorder will have sufficient time to step the tape and record the X character, then step the tape and record the Y character stored in the respective counters. In the specific example shown, the recording period encompasses some thirty-two digitizing periods. However, should the stylus be moved at such a rate as to fill one or the other of the counters prior to the end of recording period and attempt to continue to fill the counter beyond its capacity of thirty-one bits, the speed error signal will be energized, indicating to the operator that he has exceeded the recording drive of the incremental recorder.

Loading the output register 70 with X data.—The output register comprises B1, B2, B4, B8 flip-flops, the BA flip-flop and the B1, B2, B4, B8 and BA logic 250. This logic is supplied with the true outputs of each of the counter flip-flops X1, X2, X3, X4 and Y1, Y2, Y3, Y4, the false outputs $P_X$ and $P_Y$ of the polarity flip-flops, and the clock ouputs M3, $\overline{M2}$, M1, $\overline{M1}$, $\overline{M5}$, M4 and C1. While not shown herein, the outputs of the digitizing manual entry switch 30 of the manual entry keyboard are also advantageously connected to this logic as described in the copending application entitled "Graphical Data Digitizer" supra.

The structure of the B1, B2, B4, B8 and BA logic is defined by the following logical equations:

$$1B1 = X1\ M3\ \overline{M2}\ M1$$
$$+ Y1\ M3\ \overline{M2}\ \overline{M1})\ \overline{M5}\ M4\ C1 \qquad (70)$$

$$0B1 = (M4\ \overline{M3}\ M2\ M1\ C1 \qquad (71)$$

$$1B2 = (X2\ M3\ \overline{M2}\ M1$$
$$+ Y2\ M3\ \overline{M2}\ \overline{M1})\ \overline{M5}\ M4\ C1 \qquad (72)$$

$$0B2 = M4\ \overline{M3}\ M2\ M1\ C1 \qquad (73)$$

$$1B4 = (X3\ M3\ \overline{M2}\ M1$$
$$+ Y3\ M3\ \overline{M2}\ \overline{M1})\ \overline{M5}\ M4\ C1 \qquad (74)$$

$$0B4 = M4\ \overline{M3}\ M2\ M1\ C1 \qquad (75)$$

$$1B8 = (X4\ M3\ \overline{M2}\ M1$$
$$+ Y4\ M3\ \overline{M2}\ \overline{M1})\ \overline{M5}\ M4\ C1 \qquad (76)$$

$$0B8 = M4\ \overline{M3}\ M2\ M1\ C1 \qquad (77)$$

$$1BA = [(\overline{X4}\ \overline{X3}\ \overline{X2}\ \overline{X1})\ (M3\ \overline{M2}\ M1)$$
$$+ P_X\ M3\ \overline{M2}\ M1 + Y4\ M3\ Y2\ Y1\ M3\ M2\ M1$$
$$+ P_Y\ M3\ M2\ M1\ M5\ M4\ C1 \qquad (78)$$

$$0BA = M4\ \overline{M3}\ M2\ M1\ C1 \qquad (79)$$

Since each of the equations for the B1, B2, B4 and B8 flip-flops are generally similar, a description of the operation of the B1 flip-flop will suffice for all of them. Referring to the first term of Equation 70, the B1 flip-flop is set to its true state when the term $$X1\ M3\ \overline{M2}\ M1\ \overline{M5}\ M4$$

is true, i.e. in accordance with the data in the X1 counter stage and at time $T_5$ (M3 $\overline{M2}$ M1) during digitizing period #1 and the first M4 pulse 260 ($\overline{M5}$ M4 as shown in the timing diagram of FIG. 11). This operation is indicated by arrow 261 in this figure. Similarly, all of the other B flip-flops are respectively set at this same time in accordance with the data contained in the X2, X3 and X4 binary counter stages. Thus, the digitizer period #1 is divided into a first part in which the data is incremented into the X counter at time $T_1$ (arrow 262) and a second part in which the data is transferred to the output register at time $T_5$ (arrow 261). Also, during this first part, data is incremented in the Y counter at times $T_1$ and $T_2$ (arrows 262' and 262").

Referring to the first term of Equation 78, the BA flip-flop is set to its binary "1" state if all four stages X1, X2, X3 and X4 are zero to prevent an all zero character as described above and shown in FIG. 3b. The second term of Equation 78 sets the BA flip-flop to its binary "1" state if the $P_X$ flip-flop is off (indicating a negative polarity).

Recording the X data.—Data is written from the B flip-flops into the magnetic recorder in synchronization with the M4 pulses as defined by the logic equations:

$$W1 = B1\ M4 \qquad (80)$$
$$W2 = B2\ M4 \qquad (81)$$
$$W4 = B4\ M4 \qquad (82)$$
$$W8 = B8\ M4 \qquad (83)$$
$$WA = BA\ M4 \qquad (84)$$

Thus, referring to FIG. 11, the X data registered in the output register at time $T_5$ of digitizing period #1 is read between that time and time $T_4$ of the immediately succeeding digitizing period #2 (indicated by arrow 263). Typically, the data is stored by the recorder 37 in its own input register (not shown) and recorded upon receipt of the step and record signal SR which is defined by the following equation:

$$SR = D\ M4 \qquad (85)$$

where D is a fixed delay of 200 microseconds. (This delay D may be inherent with the recorder itself in which case SR may be directly provided by the M4 pulse.) Advantageously, as shown by arrow 264 in FIG. 11, the SR signal is produced at time $T_0$ between the adjacent digitizing periods #1 and #2.

Reset of X counter.—The X counter is reset at the end of digitizing period #1 during the first M4 pulse 260 of the recording cycle (as shown by arrow 265 of FIG. 11) in accordance with the following logical equation:

$$\text{Reset } X0, X1, X2, X3, X4 = M4\ \overline{M5}\ \overline{M3}\ \overline{M2}\ \overline{M1} \qquad (86)$$

this reset function comprising a ground potential applied to each binary "0" output of these T flip-flop stages to force them to trigger to a common reset state.

Reset of output register after recording of X data.—After setting of the B1 flip-flop at time $T_5$ with the X data, this flip-flop is subsequently reset to its binary "0" state at time $T_3$ in the immediately succeeding digitizing period (period #2) in accordance with Equation 71 (M4 $\overline{M3}$ M2 M1 C1) shown by arrow 266.

Loading the output register with Y data.—Immediately following reset of this flip-flop (and all of the other B flip-flops as well), the B1 flip-flop is set in accordance with the data in the Y1 counter stage and at time $T_4$ of this next digitizing period in accordance with the second term Y1 M3 $\overline{M2}$ $\overline{M1}$ $\overline{M5}$ M4 C1 of Equation 70 (see arrow 267). Similarly, all of the other B2, B4 and B8 flip-flops are respectively set at this same time in accordance with the data contained in the Y2, Y3 and Y4 binary counter stages. Accordingly, the digitizing period #2 is divided into a first part in which the data is incremented into the X counter at time $T_1$ (arrow 268) and Y counter at times $T_1$ and $T_2$ (arrows 268', 268") and a second part in which the Y data is transferred to the output register 70 at time $T_4$ (arrow 267).

The BA flip-flop is also set at this time $T_4$ if all of the stages Y1, Y2, Y3 and Y4 are zero (in accordance with the third term of Equation 78) or if the $P_Y$ flip-flop is off (in accordance with the fourth term of this equation).

Recording the Y data.—The Y data is written from the B flip-flops during the second M4 pulse 270 of the recording period in accordance with Equations 80–84 above (indicated by arrow 271) and an SR pulse applied to the recorder 37 by the second M4 pulse 270.

Reset of Y counter.—The Y counter is reset immediately following the transfer of data therein into the output register, i.e. at time $T_5$ in digitizing period #2 (see arrow 272) by the $R_Y$ flip-flop which is controlled as shown in FIG. 9 in accordance with the following logic equations:

$$1RY = \overline{M5}\ M4\ M3\ \overline{M2}\ \overline{M1}\ C1 \qquad (87)$$

$$0RY = RY\ C1 \qquad (88)$$

The RY output of the RY flip-flop clamps the binary "0" outputs of each of the T flip-flops to ground, as described above. After resetting the counter, the RY flip-flop is reset on the very next C1 pulse (Equation 88) and so remains until the occurrence of the first M4 pulse 260 of the next recording period.

Reset of output register after recording of Y data.—The output register flip-flops are reset at time $T_3$ near the end of the second M4 pulse 270 of each recording period, in accordance with Equations 71, 73, 75, 77 and 79.

X AND Y INCREMENT SIZE SELECTORS

Figure 15:
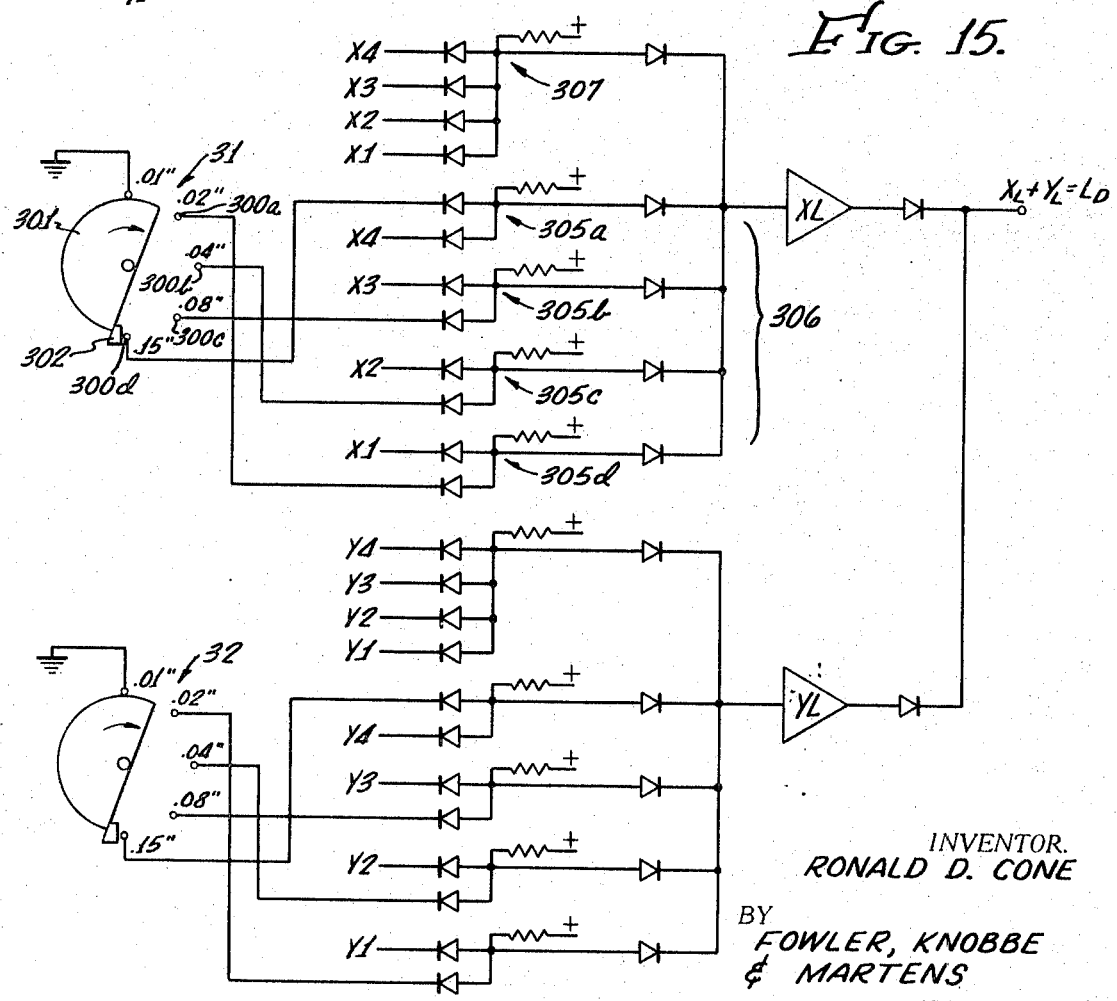
FIG. 15 is a circuit schematic of the increment size selector switches and associated logic.

The circuitry of the X and Y size selector logic stages 75 and 76 is shown in FIG. 15. Since the two selectors have similar circuitry and functions, a description of the X increment selector will serve to describe both. Thus, the multiple position switch 31 provides five selectable positions respectively labeled 0.01, 0.02, 0.04, 0.08 and 0.15 inch corresponding to the selected increment size. Four fixed contacts 300a, 300b, 300c and 300d are respectively associated with the latter four of these switch positions. The movable contact of the switch comprises a generally semi-circular grounded contact member 301 for selectively grounding the fixed contacts 300a to d. As shown, a stop member 302 prevents the movable contact from being rotated in a counter-clockwise direction from its position shown. As the switch is rotated to its respective positions, the fixed contact associated with the particular position and all preceding contacts are grounded, e.g. when the fixed contact 300c associated with the 0.08 inch increment size is grounded, the 0.04 and 0.02 contacts 300a and 300b are also grounded.

Each of the fixed contacts 300a, 300b, 300c and 300d are respectively connected to one input of a series of AND gates 305a, 305b, 305c and 305d. The other inputs of these AND gates are respectively connected to the true outputs of the X1, X2, X3 and X4 stages of the X counter. The outputs of each of these AND gates are applied to inputs of an OR gate 306 whose output is connected to the XL driver. An additional AND gate 307 has respective inputs connected ot the true outputs of each of the X counter stages and is also connected through OR gate 306 to the input of the XL driver.

The operation of the X increment size selector is as follows: When, as shown, the increment size 0.01 inch is selected by rotating the selector switch to the 0.01 inch position, respective inputs of AND gates 305a, 305b, 305c and 305d are left floating with respect to ground so that a pulse output will be produced at the output of any of these AND gates upon receipt of a true pulse from any one of the X counter stages X1 to X4. As soon as the X counter receives two successive pulses in the same direction indicative of a whole .01" increment, the X1 stage is set true causing the voltage at the output of AND gate 305d to rise and apply an XL output at the output of the XL driver.

When the selector switch 31 is rotated to the .02" increment size position, AND gate 305a is disabled since one of its inputs is continuously grounded by switch member 301. Accordingly, an output is not applied to the input of the XL driver until sufficient counts are received at the input of the X counter to trigger the X2 flip-flop. This is the desired condition since the generation of the M4 recording pulse is dependent upon XL or YL being true. Triggering of the X2 counter stage to its true position means that data has been received representing an increment length of 0.02", the same length as is then set at the selector switch 31. Therefore, setting of the X2 flip-flop results in a true XL signal, which in turn enables generation of the M4 recording pulse (see Equation 11 above).

In similar manner, AND gates 305a and 305b are disabled when the .04 increment size is selected, thereby necessitating a count corresponding to an increment size of .04" in order to generate the true XL output. Likewise, the XL output is produced only upon a count corresponding to an increment size of 0.08" when the switch is set to the 0.08 position.

When the switch is set to the 0.15" position, all of the AND gates 305a–305d are disabled; however, upon setting of all counter stages X1 to X4 to the true position (corresponding to an increment size of 0.15"), AND gate 307 is enabled so as to produce the requisite XL signal.

The operation of the Y increment size selector circuitry including the switch selector 32 and YL driver is analogous to that of the X selector. Therefore, the following logical equation may be written describing the generation of a true $L_D$ output:

$$1L_D = (X4)\ (X3)\ (X2)\ (X1) + X4\ (SX15) + X3\ (SX8) \\ + X2\ (SX4) + X1\ (SX2) + (Y4)\ (Y2)\ (Y1) + (Y1) \\ (SY2) + DP \qquad (89)$$

where SX$i$ and SY$i$ are the respective switch positions of the X and Y selector switches 31 and 32 and DP is the data point switch 33 in its actuated mode. In this manner, when either the X or Y digital counters achieve a count corresponding to the requisite increment size or the data point switch 33 is actuated, the function $L_D$ is made true, thereby enabling the generation of the M4 pulse and recording of the data contained in both the X and Y counters.

VARIABLE INCREMENT SELECTOR

Figure 16:
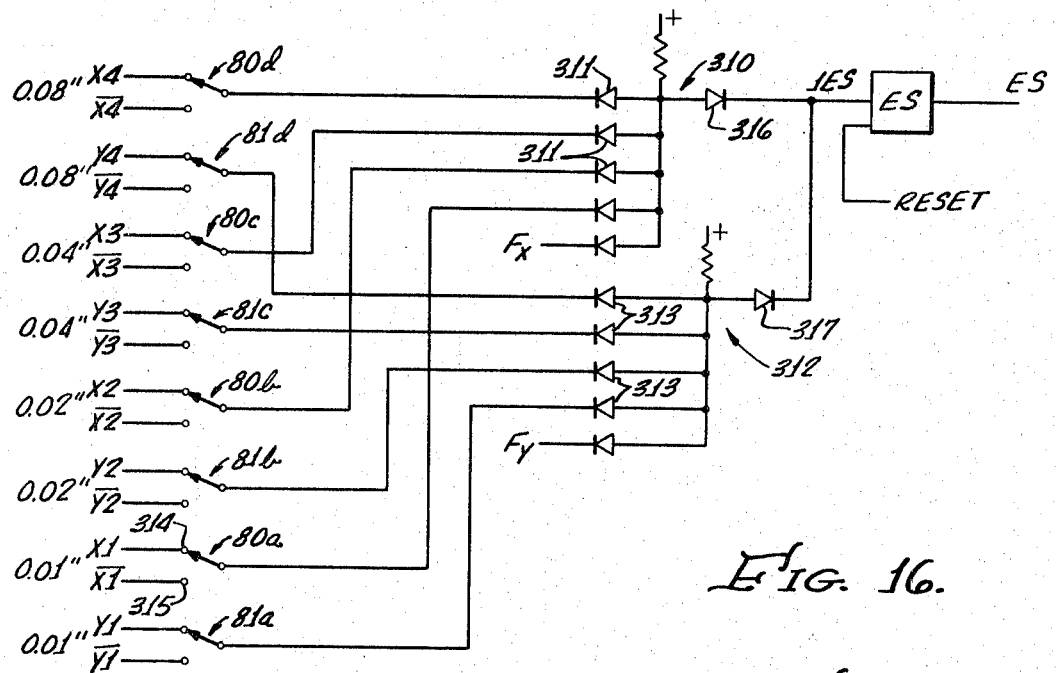
FIG. 16 is a circuit schematic of the variable increment selector switches and associated logic.

The circuitry of the variable increment selector is illustrated in FIG. 16. A first AND gate 310 comprising diodes 311 has its plural inputs respectively connected to the movable contact of each of the X toggle switches 80a, 80b, 80c and 80d and an additional input connected to the output of the $F_X$ driver. Similarly, another AND gate 312 comprising diodes 313 has its plural inputs respectively connected to the movable contacts of each of the Y toggle switches and an additional input connected to the $F_Y$ driver.

Each of the X and Y toggle switches includes a pair of stationary contacts respectively connected to the true and false outputs of an associated counter stage. Thus, the toggle switch 80a for selecting the 0.01" X increment includes a first stationary contact 314 connected to the true output X1 and another fixed contact 315 connected to the false output $\overline{X1}$ of the X1 counter stage.

The outputs of each of these AND gates 310 and 312 are connected respectively to diodes 316 and 317 forming an OR gate whose output signal is the function 1ES.

The operation of the variable increment selector is as follows: Assume for example that only switch 80a in the X selector has been flipped up, thereby selecting the .01" increment. Then, upon triggering of the X1 counter stage true, all inputs of the AND gate 310 will be true, with the exception of the $F_X$ input. A true output will then be applied at the output of this AND gate upon application of the next forward X pulse (which appears at the output of the $F_X$ driver, this output setting the ES flip-flop. The error signal ES thus indicates that the sensor has moved through a greater distance than the selected distance of 0.01" during the recording period.

In still another example, assume that all of the X toggle switches 80a, 80b, 80c and 80d have been flipped up, thereby selecting an increment size of .15". In this case, the AND gate 310 is not enabled until all of the counter stages are in their true state (corresponding to an X increment size of .15") and a true input is received from the output of the $F_X$ driver (corresponding to movement of the sensor through a distance of 0.15 inch plus one increment in the recording period). As a result, an error signal is produced indicating movement of the stylus through a distance greater than the selected increment size of 0.15″ during the recording period.

The output signal ES of the ES flip-flop is used to energize both a loud speaker 78 and a speed error signal lamp 29 in the control panel, as shown in FIG. 9 and defined by the following logic equations:

$$1 \text{ Loud Speaker} = U2 + ES \ M3 \quad (90)$$
$$1 \text{ Error Speed Light} = ES \ F2 \quad (91)$$

where F2 is an oscillatory function for causing the error speed light to blink on and off. Referring to Equation 90, it will be seen that the loud speaker is energized at the higher frequency rate of M3 upon occurrence of the speed error signal ES. Flip-flop ES remains in its set state until a reset signal is applied thereto. This is advantageously performed in conjunction with the introduction of an error code made by keyboard entry as described and claimed in the copending application "Graphical Data Digitizer," supra.

Also, a signal is applied to the loudspeaker for each recorder period (U2) thereby giving the operator an audible indication of the timing of the recording periods as he moves the stylus over the graphical data. After obtaining some experience with the digitizer, the operator will generally be able to correlate the speed of the stylus with that of the output pulses from U2 so as to closely approach but not exceed the maximum tracing speed capability of the system.

THE DATA POINT CONTROL

The variable increment mode automatically provides for accurate digitization of points since when the operator brings the stylus to its rest position, the counters are automatically cleared to within the smallest increment size selected by the selector size switches 31, 32.

The data point control (DP) provides a manual control for reading out the contents of the counters at any given point if an increment size greater than 0.01 inch is selected. As shown in Equation 89 above, the term $L_D$ is true when switch DP is operated, thereby enabling the triggering of M4 flip-flop and the initiation of a recording period.

THE DATA HOLD CONTROL

The data hold switch 34 inhibits the flow of data into the counter so long as it is actuated. The function of this control is shown in Equation 49, 50, 62, 63 above wherein all outputs of the $F_X$, $B_X$, $F_Y$ and $B_Y$ drivers are inhibited by the term DH. As described above in conjunction with FIG. 3c, this control is particularly useful for digitizing discontinuous data.

I claim:
1. A graphical data digitizer comprising:
 a housing;
 a tracing bed supported by said housing for receiving the graphical data;
 a stylus for tracing said graphical data;
 a carriage assembly mounting said stylus in juxtaposition with said tracing bed for movement along respective orthogonal axes;
 means responsive to movement of said stylus along said respective orthogonal axes for producing a data pulse output in one data channel for each movement of predetermined magnitude of said stylus along one of said respective axes and a data pulse output in another data channel for each movement of predetermined magnitude of said stylus along the other of said respective axes;
 digital counter means coupled to each of said data channels for serially accumulating said data pulses;
 recorder means for recording a character on magnetic tape, corresponding to plural data pulses; and
 means for automatically transferring at predetermined sequential, equal time intervals said accumulated data from said counter means to said recorder means and resetting said digital counter means following said data transfer, without interrupting said serial accumulating of data pulses in said digital counter means or motion of said stylus, so that (i) each recorded character represents a digital code corresponding to the distance traced by the stylus along one of said respective axes during one of said predetermined equal time intervals, and (ii) said recorded characters correspond to successive distances traced by said stylus.

2. The graphical data digitizer described in claim 1 comprising:
 means for selectively varying the length of said predetermined sequential equal time intervals, said means being coupled to said digital counter means for enabling said counters to accumulate numbers of data pulses in different proportions to the stylus velocity.

3. The graphical data digitizer described in claim 1 comprising data hold means for inhibiting the flow of data from said data channels to said digital counter means so that the stylus can be selectively moved over said tracing bed without a corresponding accumulation of data in said counter means.

4. The graphical digitizer described in claim 1 comprising:
 means for providing a selectable sampling increment size whereby the recording of data is dependent upon said stylus traversing a minimum preselected distance, said means being responsively coupled to said digital counter means for inhibiting the transfer of data from said counter to said recorder means and the reset of said counter until a predetermined number is accumulated within said counter.

5. The graphical data digitizer described in claim 4 comprising:
 data point means for selectively transferring data from said counter to said recorder means regardless of the number recorded within said counter, said means recording the position of a selected point to within the resolution limits of the digitizer.

6. A graphical data digitizer comprising:
 means for following graphical data;
 digital encoder means coupled to said follower means for producing digital data corresponding to incremental movement and direction of movement of said follower means along said graphical data;
 accumulator means responsively coupled to said digital encoder means for accumulating output digital data therefrom during each of plural, sequential, equal time intervals, said data corresponding to distance traveled and direction of travel of said follower means during said time intervals;
 means coupled to said accumulator means for recording on a recording medium a digitally coded character corresponding to the data accumulated in said accumulator means including the direction of travel of said follower means during the preceding time interval, and
 means for automatically transferring at the end of said time intervals said accumulated data from said accumulator means to said recorder means and resetting said accumulator means following said data transfer, said transfer means being operable without interruption of said accumulator means or the motion of said following means, the amount of said accumulated data inherently varying in proportion to the velocity of said follower means so that the sampling interval determined by the distance traveled by said follower means between successive recorded data characters is automatically varied proportional to the velocity at which said follower means is translated over said graphical data.

7. The graphical data digitizer described in claim 6 comprising:

variable increment selector means for preselecting a maximum travel distance for said follower means during each of said time intervals, said means being coupled to said accumulator means for comparing said accumulated output data with said preselected distance.

8. The graphical data digitizer described in claim 7 comprising:
means responsive to said variable increment selector means for providing an output stimulus when said digital encoder means supplies said accumulator means with digital data corresponding to a movement of said follower means through a distance greater than said preselected distance therefor in said time interval.

9. The graphical data digitizer described in claim 8 wherein: said stimulus is an audio alarm.

10. The graphical data digitizer described in claim 8 wherein: said stimulus is a source of light.

11. The graphical data digitizer described in claim 7 wherein:
said accumulator means includes plural binary stages for accumulating the output data from said digital encoder means, and
said variable increment selector means comprises means for preselecting binary states representative of said maximum travel distance, said states being compared with the states in said accumulator means for producing an output signal upon receipt of digital data from said digital encoder means corresponding to a distance greater than said selected maximum distance.

12. The graphical data digitizer described in claim 7 comprising:
means for selectively inhibiting the flow of data from said digital encoder means to said accumulator means so that said follower means can be translated without accumulating digital data corresponding to said translation.

13. The graphical data digitizer described in claim 6 wherein:
said accumulator means comprises a reversible binary counter performing an algebraic addition of the output data from said digital encoder means.

14. The graphical data digitizer described in claim 6 wherein:
said digital encoder means produces output data corresponding to incremental movement of said follower means along respectively orthogonal X and Y axes, and
said accumulator means comprises a first plurality of binary stages for accumulating data corresponding to the distance traveled along said X axis and a second plurality of binary stages for accumulating data corresponding to the distance traveled along said Y axis.

15. The graphical data digitizer described in claim 14 comprising:
variable increment selector for preselecting a maximum travel distance for said follower means during said time interval including:
means for preselecting binary states which represent a maximum travel distance for said follower means along said X axis during said time interval;
means for comparing said X axis selected states with the states of said first plurality of binary stages and producing an output signal when the algebraic sum of the X input data from said digital encoder means represents a dstance exceeding said preselected X axis maximum distance;
means for preselecting binary states which represent a maximum travel distance for said follower means along said Y axis during said time interval; and
means for comparing said Y axis selected states with the states of said second plurality of binary stages and producing an output signal when the algebraic sum of the Y input data from said digital encoder means represents a distance exceeding said preselected Y axis maximum distance.

16. A graphical data digitizer comprising:
means for following graphical data;
recording means for recording on a recording medium digitally encoded characters corresponding to translation of said follower means over said graphical data;
means responsively coupled to said follower means for supplying digital data to said recording means corresponding to the sampling interval of digitization, said sampling interval of digitization being the distance traveled by the follower means between successive recorded data characters, said means automatically varying said sampling interval proportional to the speed at which said follower means is translated over said graphical data; and
means for preselecting a minimum increment size, said means comparing the accumulated output data in said accumulator means with said preselected minimum increment size and continuing the accumulation of data in said accumulator means during successive ones of said predetermined time intervals until the accumulated data corresponds to said preselected minimum increment size.

17. The graphical data digitizer described in claim 16 comprising:
means for selectively recording the data accumulated in said accumulator means regardless of the accumulated value, said means overriding said minimum increment size selector and recording a selected point to within the resolution limits of the digitizer.

18. The graphical data digitizer described in claim 14 comprising:
an increment size selector for inhibiting recording of data until said follower means has traversed a minimum preselected X or Y distance, including:
means for preselecting binary states which represent a minimum travel distance for said follower means along said X axis;
first comparison means for comparing said X axis selected states with the states of said first plurality of binary stages;
means for preselecting binary states which represent the minimum travel distance for said follower means along said Y axis;
second comparison means for comparing said Y axis selected states with the states of said second plurality of binary stages; and
means responsive to said first and second comparison means for inhibiting the recording of said accumulated data and continuing the accumulation of said data in said accumulator means during successive ones of said time intervals until the accumulated data corresponds to said preselected value.

19. The graphical data digitizer described in claim 6 comprising:
a clock means for defining said time intervals and a plurality of digitizing periods within each of said time intervals, and
means coupling said clock to said accumulator means for incrementing the output digital data from said digital encoder means into said accumulator means each digitizing period; and
means coupling said clock means to said recorder means for transferring said accumulated data to said recorder means at the end of each of said time intervals.

20. The graphical data digitizer described in claim 19, wherein:
said clock means further divides each digitizing period so that said output digital data from said digital encoder means is incremented into said accumulator means during the first part of each of said digitizing periods and transferred from said accumulator means to said recording means once during each of said time intervals, said transfer occurring during the latter part of one of said digitizing periods.

21. The graphical data digitizer described in claim 14, comprising:
clock means for defining said time intervals and a plurality of digitizing periods within each of said time intervals, each said digitizing periods being still further sub-divided into respective first and second parts, and
means coupling said clock means to said first and second binary stages of said accumulator means for incrementing both the X and Y output digital data from said digital encoder into said stages during the first part of each of said digitizing periods and transferring the X data from said first binary stages to said recording means during the latter part of one of said digitizing periods and the Y data from said second binary stages to said recording means during the latter part of the immediately succeeding digitizing period, said transfer occurring once during each of said time intervals.

22. A graphical data digitizer comprising:
a housing;
a tracing bed supported by said housing for receiving the graphical data;
a stylus for tracing said graphical data;
a carriage assembly mounting said stylus in juxtaposition with said tracing bed for movement along respective orthogonal X and Y axes;
digital encoder means responsive to movement of said stylus along said respective orthogonal X and Y axes for producing digital data corresponding to incremental movement in direction of movement of said stylus along said graphical data, said digital encoder means including
means for providing X output data responsive to movement of said stylus along the X axis; and
means for providing Z output data responsive to movement of said stylus along the X and Y axes where $Y = Z - X$,
a clock for defining a digitizing period and a recording period comprising a predetermined number of said digitizing periods,
first digital counter means coupled to said digital encoder means for adding said X output data, said counter being incremented once each digitizing period to record said X data,
data converter means responsive to said X and Z output data for providing Y data at its output in accordance with the equation $Y = Z - X$, and
second digital counter means coupled to said data converter means for adding said Y output data, said counter being incremented twice each digitizing period in order to record 2Y data when the term $Z - X$ equals a plus or minus 2.

23. A graphical data digitizer comprising:
a housing;
a tracing bed supported by said housing for receiving the graphical data;
a stylus for tracing said graphical data;
a carriage assembly mounting said stylus in juxtaposition with said tracing bed for movement along respective orthogonal X and Y axes;
means responsive to movement of said stylus along said respective orthogonal axes for producing a data pulse output in an X data channel for each movement of predetermined magnitude of said stylus along said X axis and a data pulse output in a Y data channel for each movement of predetermined magnitude of said stylus along said Y axis;
a clock for defining a digitizing period and a recording period comprised of a predetermined number of said digitizing periods;
X and Y counter means responsive to the digitizing period of said clock and coupled to said data channels so that said X and Y counters are respectively incremented in each of said digitizing periods in accordance with movement of said stylus along said X and Y axes;
recorder means for recording digital data as a character on magnetic tape; and
data transfer means responsive to the recording period of said clock for transferring data from said X and Y counter means to said recorder means following said predetermined number of said digitizing periods.

24. The graphical data digitizer described in claim 23, wherein:
said data transfer means includes means for storing said data following said predetermined number of digitizing periods, and
said clock divides said recording period into first and second time periods, said data transfer means transferring data from one of said counter means to said recorder means during said first time period and from the other of said counter means to said recording means during said second time period.

25. A graphical data digitizer comprising:
a housing;
a tracing bed supported by said housing for receiving the graphical data;
a stylus for tracing said graphical data;
a carriage assembly mounting said stylus in juxtaposition with said tracing bed for movement along respective X and Y orthogonal axes;
means responsive to movement of said stylus along said respective orthogonal axes for producing a data pulse output in an X data channel for each movement of predetermined magnitude of said stylus along said X axis and a data pulse output in a Y data channel for each movement of predetermined magnitude of said stylus along said Y axis;
a clock for defining a digitizing period and a recording period comprised of a predetermined number of said digitizing periods;
X and Y counter means responsive to the digitizing period of said clock and coupled to said data channels so that said X and Y counters are respectively incremented in each of said digitizing periods in accordance with movement of said stylus along said X and Y axes;
recorder means for recording digital data as a character on magnetic tape; and
output storage means responsive to said clock for temporarily storing the data accumulated in said counter means, said output storage and said X and Y counter means being synchronized to said clock to perform the following operational sequence during said recording interval:
increment the data in said X and Y channels into said X and Y counters, transfer the data in said X counter into said output storage means, and write the data in said output storage means into said recorder during a first digitizing period;
incrementing data in said X and Y channels into said X and Y counters, resetting said output storage means to zero, and transferring the data in said Y counter into said output storage means during the immediately succeeding digitizing period;

continuing to increment said X and Y channels into said X and Y counters for a predetermined number of digitizing periods sufficient to enable said recorder to have recorded the binary encoded value of such X data as a character on said magnetic tape;

incrementing said X and Y channels into said X and Y counters and writing the data in said output storage means into said recorder in the next succeeding digitizing period; resetting said output storage means to zero in a following digitizing period; and continuing to increment said X and Y channels into said X and Y counters for a predetermined number of digitizing periods sufficient to enable said recorder to have recorded the binary encoded value of said Y data as a character on said magnetic tape.

References Cited

UNITED STATES PATENTS

| | | | |
|---|---|---|---|
| 2,851,596 | 9/1958 | Hilton | 235—92X |
| 3,238,501 | 3/1966 | Mak et al. | 340—146.3 |
| 3,345,747 | 10/1967 | Sattler | 33—1 |
| 3,372,485 | 3/1968 | Mangus et al. | 33—1(M) |
| 3,422,537 | 1/1969 | Dewey et al. | 31—1(M)X |

MAYNARD R. WILBUR, Primary Examiner

M. K. WOLENSKY, Assistant Examiner

U.S. Cl. X.R.

33—1

PO-1050
(5/69)

UNITED STATES PATENT OFFICE
CERTIFICATE OF CORRECTION

Patent No. 3,553,681  Dated January 5, 1971

Inventor(s) R. D. Cone

It is certified that error appears in the above-identified patent and that said Letters Patent are hereby corrected as shown below:

Column 10, line 31, "encoding" should be --coding--.
Column 13, line 5, "digital" should be --digitizing--; line 2 insert between equations "(38)" and "(39)" --Similarly, a negative movement in the X direction is defined as follc --; lines 39-40, delete in their entirety.
Column 14, line 1, "country" should be --counter--; line 16, "$1P_X = Al_XCl$" should be --$1P_X = Al\ Z_X\ Cl$--; line 19, "$U_X = \ldots$" should be --$Z_X = \ldots$--.
Column 15, line 65, "basic" should be --logic--; line 70, "$-Y = [\overline{AZ}\ldots$" should be -- $-Y = [(\overline{AZ}\ldots$--.
Column 16, line 22, "$\ldots+(\overline{P_Y} + Z_Y)\ (-Y]\ DH$" should be --$+(\overline{P_Y}\ Z_Y)\ (-Y)]\ \overline{DH}$--; line 23, "$\ldots+(\overline{P_Y})\ (+Y)]\ (Z_Y)\ DH$" shoulc be--$\ldots+(\overline{P_Y})\ (+Y)]\ (\overline{Z_Y})\ \overline{DH}$--; line 26 "$Z_Y$" should be --$\overline{Z}$ line 40, "of" should be --by--.
Column 17, line 16, "$P_X$ and $P_Y$" should be --$\overline{P_X}$ and $\overline{P_Y}$--; line "$+P_X\ldots Y4\ \overline{M3}\ \overline{Y2}\ \overline{Y1}\ M3\ \overline{M2}\ \overline{M1} + P_Y\ M3\ M2\ \overline{M1}\ M5\ M4\ C1$" shou be --$\ldots+\overline{P_X}\ M3\ \overline{M2}\ M1 + \overline{Y4}\ \overline{M3}\ \overline{Y2}\ \overline{Y1}\ M3\ \overline{M2}\ \overline{M1} + \overline{P_Y}\ M3\ \overline{M2}$ $\overline{M1}]\ \overline{M5}\ M4\ C1$--.
Column 20, line 22, "$\ldots(Y4)\ Y2)\ (Y1) + (Y1)(SY2) + DP$" shoulc be --$\ldots(Y4)\ (Y3)\ (Y2)\ (Y1) + (Y4)\ (SY15) + (Y3)\ (SY8) +$ $(Y2)\ (SY4) + (Y1)\ SY2) + DP$--.
Column 22, line 25, after "graphical" insert --data--.
Column 23, line 69, "dstance" should be --distance--.

Signed and sealed this 20th day of April 1971.

(SEAL)
Attest:

EDWARD M. FLETCHER, JR.
Attesting Officer

WILLIAM E. SCHUYLER, JR.
Commissioner of Patents